United States Patent [19]
Blanyer et al.

[11] Patent Number: 5,925,470
[45] Date of Patent: *Jul. 20, 1999

[54] COATED ELONGATED CORE MATERIAL

[76] Inventors: Richard J. Blanyer, P.O. Box 18394, Austin, Tex. 78760; Charles L. Mathews, P.O. Box 6290, Austin, Tex. 78762

[*] Notice: This patent is subject to a terminal disclaimer.

[21] Appl. No.: 08/991,864

[22] Filed: Dec. 16, 1997

Related U.S. Application Data

[63] Continuation of application No. 08/124,834, Sep. 21, 1993, which is a continuation of application No. 08/042,456, Apr. 5, 1993, abandoned, which is a continuation of application No. 07/643,913, Jan. 22, 1991, abandoned, which is a continuation of application No. 07/255,973, Nov. 10, 1988, Pat. No. 5,010,637, which is a continuation of application No. 07/014,250, Feb. 12, 1987, abandoned, which is a division of application No. 06/763,851, Aug. 12, 1985, Pat. No. 4,658,623, which is a continuation-in-part of application No. 06/643,676, Aug. 22, 1984, abandoned.

[51] Int. Cl.⁶ .................................................... B32B 15/02
[52] U.S. Cl. ......................... 428/607; 428/645; 429/233
[58] Field of Search ............................... 29/2, 623.1, 458, 29/527.2, 505, 520; 72/268, 270, 272, 273; 428/375, 379, 383, 389, 607, 645; 57/210, 211, 232, 237, 241, 292, 295; 174/103, 104, 126.4, 128.1; 429/233, 234, 241

[56] References Cited

U.S. PATENT DOCUMENTS

| | | | |
|---|---|---|---|
| 274,699 | 3/1883 | Barker | 174/103 |
| 275,859 | 4/1883 | Robertson . | |
| 434,866 | 8/1890 | Goodin | 72/268 |
| 1,933,112 | 10/1933 | Held | 174/103 X |
| 2,031,014 | 2/1936 | Staples | 72/268 X |
| 2,243,031 | 5/1941 | Fogg | 72/268 |
| 2,251,913 | 8/1941 | Brennan . | |
| 2,360,097 | 10/1944 | Balthis et al. . | |
| 2,380,722 | 7/1945 | Brown | 72/270 X |
| 2,694,099 | 11/1954 | Zahn . | |
| 2,694,100 | 11/1954 | Zahn . | |
| 2,864,126 | 12/1958 | Henning . | |
| 2,893,056 | 7/1959 | Henning . | |
| 2,924,332 | 2/1960 | Lawton et al. | 72/268 X |
| 2,963,739 | 12/1960 | Whitehurst et al. . | |
| 2,980,956 | 4/1961 | Whitehurst et al. . | |

(List continued on next page.)

FOREIGN PATENT DOCUMENTS

| | | |
|---|---|---|
| 352506 | 8/1935 | Canada . |
| 377048 | 10/1938 | Canada . |
| 455709 | 4/1949 | Canada . |
| 524087 | 4/1956 | Canada . |
| 796578 | 10/1968 | Canada . |
| 0 107 517 | 5/1984 | European Pat. Off. . |
| 1044934 | 11/1953 | France . |
| 1092426 | 4/1955 | France . |
| 21714 | 5/1882 | Germany . |
| 947881 | 8/1956 | Germany . |
| 2 305 152 | 8/1974 | Germany . |
| 25 58 815 | 6/1977 | Germany . |
| 28 37 847 | 3/1979 | Germany . |
| 42-27550 | 12/1967 | Japan . |
| 53-19157 | 2/1978 | Japan . |
| 59-31857 | 2/1982 | Japan . |
| 32-4317 | 9/1991 | Japan . |
| 170811 | 11/1934 | Switzerland . |
| 698761 | 10/1953 | United Kingdom . |
| 699082 | 10/1953 | United Kingdom . |
| 910047 | 11/1962 | United Kingdom . |
| 1032852 | 6/1966 | United Kingdom . |
| 1117998 | 6/1968 | United Kingdom . |
| 2 052 839 | 1/1981 | United Kingdom . |
| 2 070 844 | 9/1981 | United Kingdom . |
| 2 085 645 | 4/1982 | United Kingdom . |

*Primary Examiner*—S. Thomas Hughes
*Attorney, Agent, or Firm*—Wall Marjama Bilinski & Burr

[57] ABSTRACT

A composite wire made by coating a core material by solid-phase extrusion of a uniform layer of a corrosion resistant metal onto the core material. The metal includes lead and has uniform, small and longitudinally oriented grains.

8 Claims, 7 Drawing Sheets

U.S. PATENT DOCUMENTS

| | | | |
|---|---|---|---|
| 3,211,821 | 10/1965 | Wakefield | 174/103 X |
| 3,366,728 | 1/1968 | Garwin et al. | 174/128.1 X |
| 3,397,088 | 8/1968 | Berger et al. . | |
| 3,466,193 | 9/1969 | Hughel . | |
| 3,526,168 | 9/1970 | Brown | 92/172 |
| 3,556,855 | 1/1971 | Howells . | |
| 3,560,262 | 2/1971 | Baba et al. . | |
| 3,646,776 | 3/1972 | Tanaka et al. | 72/258 |
| 3,646,796 | 3/1972 | Tanaka et al. . | |
| 3,657,014 | 4/1972 | Faber . | |
| 3,703,413 | 11/1972 | Arrance . | |
| 3,767,842 | 10/1973 | Bronca et al. | 174/128.1 |
| 3,770,507 | 11/1973 | Weissman et al. . | |
| 3,776,612 | 12/1973 | Barlow . | |
| 3,807,026 | 4/1974 | Takeo et al. | 29/419.1 |
| 3,808,040 | 4/1974 | Barnes et al. . | |
| 3,940,533 | 2/1976 | Arsac . | |
| 3,958,066 | 5/1976 | Imamura et al. . | |
| 3,973,991 | 8/1976 | Cestaro et al. . | |
| 4,091,183 | 5/1978 | Niggl . | |
| 4,110,241 | 8/1978 | Pirkulov et al. . | |
| 4,128,371 | 12/1978 | Kopp | 72/272 X |
| 4,169,911 | 10/1979 | Yoshida et al. . | |
| 4,264,649 | 4/1981 | Claypoole et al. . | |
| 4,275,130 | 6/1981 | Rippel et al. . | |
| 4,312,913 | 1/1982 | Rheaume . | |
| 4,349,067 | 9/1982 | Wirtz et al. | 164/439 X |
| 4,353,969 | 10/1982 | Rippel et al. . | |
| 4,507,855 | 4/1985 | Moseley et al. | 29/623.1 |
| 4,624,097 | 11/1986 | Wilcox | 57/232 |
| 4,661,403 | 4/1987 | Morin | 428/389 X |

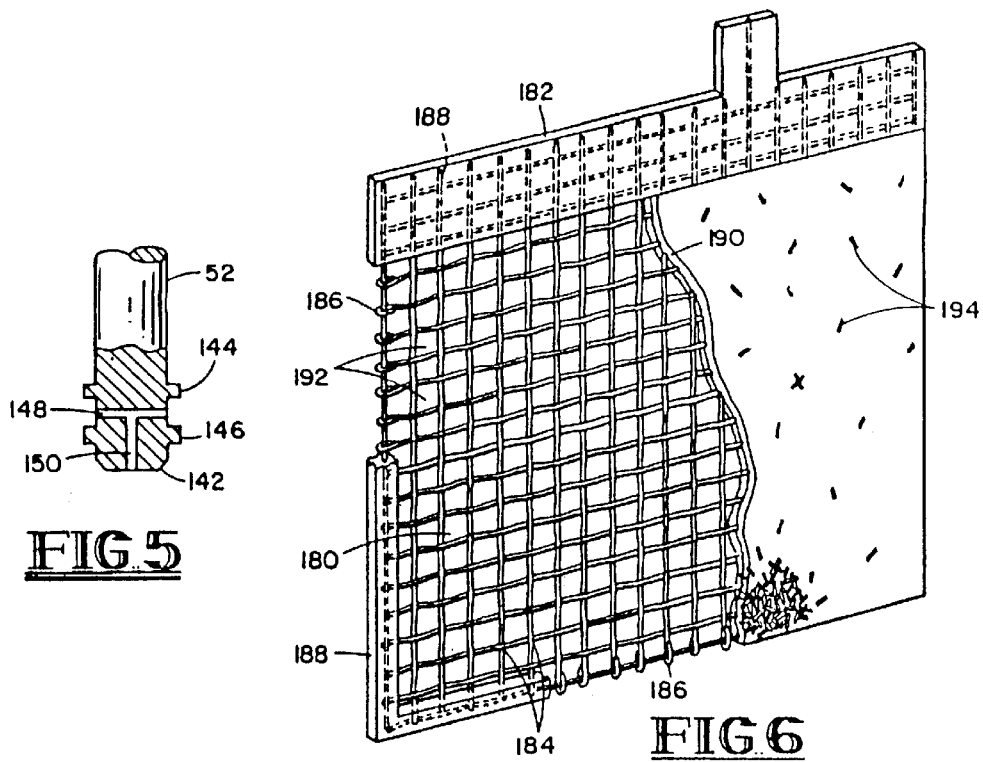
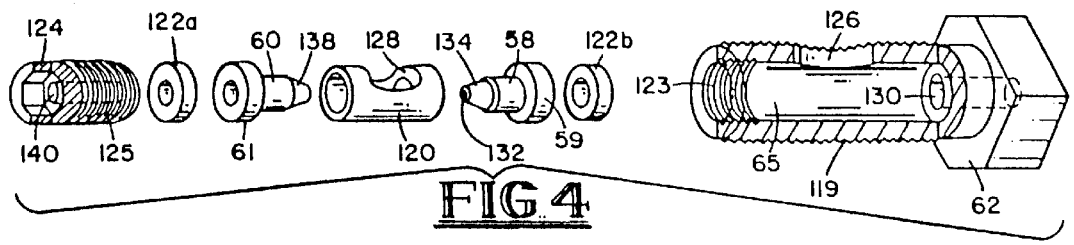
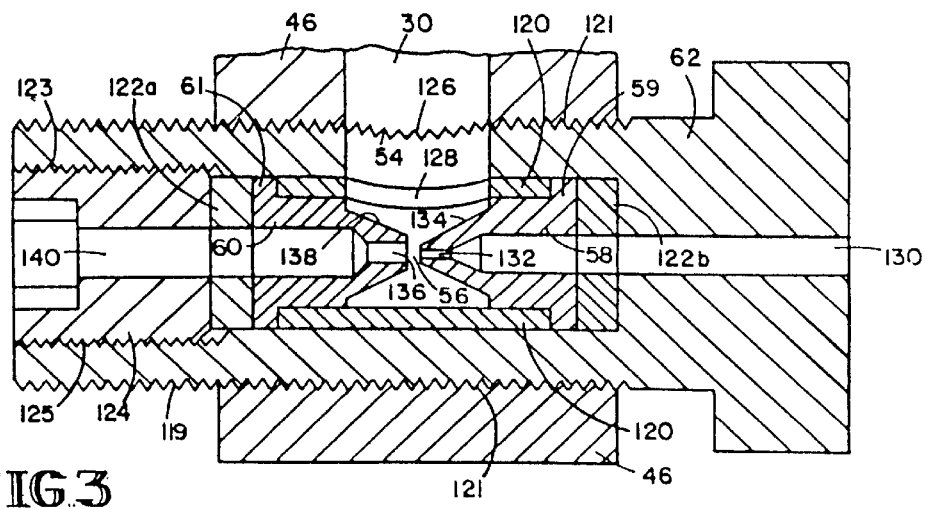

COATED ELONGATED CORE MATERIAL

This is a continuation of application Ser. No. 08/124,834, filed Sep. 21, 1993, which in turn is a continuation of Ser. No. 08/042,456, filed Apr. 5, 1993, now abandoned, which is a continuation of Ser. No. 07/643,913, filed Jan. 22, 1991, now abandoned, which is a continuation of Ser. No. 07/255, 973, filed Nov. 10, 1988, now U.S. Pat. No. 5,010,637, which is a continuation of Ser. No. 07/014,250, filed Feb. 12, 1987, now abandoned, which is a divisional of Ser. No. 06/763,851, filed Aug. 12, 1985, now U.S. Pat. No. 4,658, 623, which is a continuation-in-part of Ser. No. 08/643,676, filed Aug. 22, 1984, now abandoned, the entireties of which are incorporated herein by reference.

The present application is a continuation-in-part application of co-pending application Ser. No. 643,676, filed on Aug. 22, 1984.

BACKGROUND OF THE INVENTION

The present invention relates to a method and apparatus for coating metal wire or fibrous materials with metal. The invention relates also to a scrim which may be woven from such a composite wire and the use of the scrim in the electrodes of electrochemical cells. More particularly, the present invention relates to a method and apparatus capable of producing continuous lengths of fine composite wire comprised either of metal wire coated with an extrudible, corrosion-resistant metal or a fibrous core material coated with an extrudible, corrosion-resistant metal such as lead, the weaving of that composite wire into a scrim, and the use of that scrim as an electrode grid in an electrochemical cell.

Conventional batteries include electrodes having metallic substrates on which a layer of active material is deposited. The battery may contain several pairs of positive and negative electrodes, stacked, rolled or suspended within a battery case and covered by the electrolyte contained within the battery case. Most conventional rechargeable batteries are of the lead acid type. The electrode grids of conventional lead acid batteries are coated with an active material, usually a lead oxide. The active material in the negative electrode contains expanders which allow the plate to become spongy when it is formed. A "forming" charge is applied to both positive and negative plates to convert the layer of active material on the positive plate to a porous oxide of lead and the layer of active material on the negative plate to sponge lead.

Conventional state of the art lead acid batteries are relatively heavy, causing the battery to have a low specific energy. The specific energy of some commercially available, state of the art lead acid batteries is on the order of about 14 watt hours per pound at the three hour discharge rate. The heavy weight of the battery is a direct consequence of the use of large amounts of lead in the electrodes, both in the grid and in the active material, and in the connectors and straps, or bus bars, of the battery.

Thick lead grids are required for several reasons. For instance, the active material usually takes the form of a paste which is cured onto the grid. Although the paste adheres well to itself, it does not adhere well to the electrode grid, particularly during repeated charge-discharge cycles. Because of this characteristic, the grid must be made more substantial so that it can act as a latticework to help support the active material.

Further, the electrode grid itself is relatively fragile, necessitating a construction which is heavier than needed for the grid to perform its electrical function. The grid used in many conventional lead-acid batteries is formed either by casting liquid lead into a mold of the desired configuration or by expanding sheet lead into a mechanically stiff grid. The grid is then assembled into the electrode assembly.

During the manufacture of the electrode, its handling, and its assembly into the battery, it is subjected to a number of mechanical stresses. Once assembled into the battery, the electrode will be subjected to a number of induced stresses. The primary source of manufacturing stress is the pasting operation, during which the paste of active material is troweled onto and into the grid. As it is troweled into and onto the grid, the paste, which is heavy and relatively stiff (i.e., not very plastic), tends to bend, stretch and tear the latticework. This deformation of the grid structure results in many points at which the lead in the grid is stressed, and it is at these stress points where corrosion will occur first and proceed at the fastest rate. Thus, expanded metal grids, which offer the advantage of being lighter than cast grids, are inherently susceptible to accelerated stress corrosion because each point at which the metal sheet was expanded represents a stress point.

The induced stresses are the result of factors such as volumetric growth and shrinkage of the electrode during battery charge and discharge cycles, sagging of the conductors due to the pull of gravity on the heavy mass of active material which they support, and, if the battery is used in an application such as in an automobile, vehicle shock, thermal cycling, and vibration. Mechanical failure of the electrode occurs when the mechanical and induced stresses to which the electrode is subjected exceed the tensile and/or shear strength of the materials comprising the electrode. To help prevent premature mechanical failure of the electrodes due to these stresses, it is necessary to manufacture them in thicknesses which enable them to withstand the stresses to which they are likely to be subjected. Because so much lead must be used to provide the thickness which enables the grid to withstand these stresses, conventional grids have cross-sectional dimensions that are much larger than is required for actually conducting electrical current. The result of the use of thick grids is a battery which is relatively heavy, and has a low specific energy and material utilization factor.

In addition to a thick grid, a thick coating of active material on the electrodes is necessary to increase battery capacity. The thick coating is necessary because, as a general rule, the thicker the layer of active material, the greater the capacity of the battery to store electrical energy.

As the volume (and weight) of active material is increased and the weight of the battery case, straps, posts and grid conductors remains relatively constant, the utilization of the active material is increased on a per unit weight basis. This increased utilization results in an increase in the specific energy of the battery. However, the active material utilization factor of many state of the art lead acid batteries is only approximately 50–55% of battery weight.

The thickness of the layer of active material requires that the grid latticework be strong enough to support this thicker layer of active material. Because of the relatively low tensile strength of pure lead, it is necessary to make the lead grids substantially thicker than would be necessary to enable them to serve their electrical function so that the grids will withstand the above-described mechanical and induced stresses.

There are limits to the thickness of the layer of active material. One limitation is imposed by the weight of the active material. Another limitation is a result of the electrical characteristics of the active material. The active material on the positive electrode is a semiconductor, that is, due to its own internal resistance, it is capable of conducting electricity only a relatively short distance through itself. Consequently, the thickness of the active material is limited to that distance through which the active material is capable of efficiently conducting current. This characteristic of the active material is one reason for the presence of the grid conductor in the positive electrode. The grid conductor serves the function of conducting the current generated in the active material out of the active material.

The thickness of the layer of active material is also limited by the relative inability of the active material to adhere to the grid during charge-discharge cycling and by its low tensile strength. As a result of these characteristics, the above-described mechanical stresses often cause the grid to prematurely shed the fragile active material. Additional battery weight results from the fact that precautions must be taken to prevent any active material from floating loose in the electrolyte in the cell and shorting out the battery. The electrodes may be provided with special glass compression pads to compress the active material against the grid, thereby preventing a short circuit in the cell, but also adding to the weight of the battery without improving battery capacity.

As a result of these factors, most of the batteries available to date represent a balance between durability, capacity and specific energy, with certain of these factors being optimized for certain applications. For instance, in applications in which the weight of the battery is the most important concern, the electrodes are manufactured with the thinnest layer of active material practical and grids are pared down as much as is made possible by the reduced thickness of the active material. A battery with a thin layer of active material and relatively light weight grids represents a trade-off of increased manufacturing costs, shorter battery life and lower capacity for lighter battery weight.

Another problem, also related to the weight, bulk and capacity of lead acid batteries is the fact that these factors make it difficult to construct a rechargeable battery in flashlight battery sizes, i.e., "D cells", "C cells" and so on down to "AAA cells" and smaller, special purpose batteries. Spiral wound lead acid cells are easily connected in series to form batteries, which are available in sizes ranging from "BC" to "D." These cells produce high currents and are constructed from lead grids which are die cut from a flat sheet of pure lead which is rolled inside the round battery case in a tight spiral. Each spiral grid has a relatively large surface area, and there is no need to connect several small grids in parallel as in a conventional battery, resulting in a savings in weight and the cost of manufacture, and these cracks are highly susceptible to attack by the acid, causing the rapid corrosion of the grid.

However, no cells in sizes below "D" are available commercially because the soft, thick (about 0.04 inches) grid used in these cells cannot be rolled into a spiral which is tight enough to be used in batteries of smaller diameter. Cracks and stress points form on the grids of batteries of this size because the radius of curvature of the grid exceeds that associated with the maximum strength of the lead. These cracks are highly susceptible to attack by the acid of the battery, resulting in the rapid corrosion of the grid.

These same problems are involved in the construction of conventional nine volt rechargeable batteries. At present, the only readily available, multi-purpose rechargeable nine volt battery is constructed of nickel and cadmium (the "nicad" battery). This battery contains six 1.25 volt cells and produces about 7.5 volts. It is unusable for some nine volt applications because of its low voltage. However, the more serious limitation of the nicad battery is its so-called "memory." A nicad battery which is repeatedly discharged at low currents will occasionally "forget" that it is capable of delivering high currents, a result of the chemical conditions within the cells. Although reversible, this characteristic results in the decrease of the life of the battery if the battery is left on float or standby charge for indefinite periods.

There have been many attempts to improve upon the basic scheme governing the construction of electrochemical cells. One approach attempts to make advantageous use of the fact that the outer surface (approximately the outer $5 \times 10^{-3}$ inches) of the lead grid element provides all the electrical conductivity and surface area required for attachment of the active material. Hence, most of the lead in a conventional electrode grid does not participate in the electrochemical function, but merely provides the strength and stiffness for the grid to survive its environment and manufacturing stresses. This approach is characterized by the building of electrodes which provide only an outer layer of lead on the grid element by depositing a layer of lead on a substrate which possesses the desired properties of light weight and high mechanical and chemical durability.

This approach is exemplified by, for instance, U.S. Pat. No. 4,275,130. This patent discloses a battery in which the electrodes take the form of parallel stacked biplates composed of a thermoplastic material such as polypropylene with conductive fibers of carbon or metal embedded in it to serve as strengthening and conducting elements. Each biplate is provided with parallel stripes of lead in electrical contact with the conductive fibers to serve as a grid. The active material is held between thin, porous glass mats, and the stacked assembly is then axially compressed and assembled into the battery case.

This approach is also exemplified by U.S. Pat. No. 3,808,040, which discloses a method of manufacturing battery plate grids which involves the strengthening of a conductive lattice work to serve as a grid element by depositing strips of synthetic resin on the lattice work. This patent is hereby incorporated into the present disclosure by reference thereto.

U.S. Pat. No. 3,973,991, incorporated herein by reference thereto, discloses a light-weight electrode assembly comprised of at least three layers. The center layer, or grid, is formed of a thin, perforated sheet of a conductive metal such as lead, and the layers on either side of the grid are comprised of a paste of active material with short synthetic fibers or a mixture of synthetic and natural fibers suspended in the paste to help hold it together. The disclosure of this patent indicates that the center, conductive layer may be as much as 90% open area. However, a lead grid with this much open area might be much too fragile to manufacture at reasonable cost or to use in many applications, a fact which is implicitly recognized by the examples set forth in the disclosure of that patent which describe a thin layer of only approximately 56% open area.

U.S. Pat. No. 3,556,855 discloses a grid element comprised of an electrically conductive resin and metal coated glass fibers. The fibers are of short length, are dispersed in the resin, and have a layer of an electrically conductive metal deposited on them according to methods known in the art. Only silver, copper and nickel-coated glass fibers are disclosed by this patent, which is hereby incorporated herein by reference thereto.

U.S. Pat. No. 4,091,183 discloses a solid plate lead core grid with a special surface profile. This grid element is comprised of a solid core of lead sandwiched between two porous envelopes which contain the active material of the electrode and are provided with a special surface configuration. Electrodes of this type are assembled into a battery which is capable of resisting plate deformation during hard and deep discharges, but which represents no weight or capacity advantage.

This approach is also represented by U.S. Pat. No. 3,560,262, which discloses a non-woven nylon wafer with a thick coating of conductive metal electroplated onto it for use as a grid in the electrodes of alkaline batteries. The nickel hydroxide or cadmium hydroxide active material is deposited into the pores of the conductive metal.

Other attempts to improve on the prior art batteries have focused on the active material. For instance, U.S. Pat. No. 3,466,193 discloses a positive electrode comprised of a paste of lead dioxide containing 5–25% weight short lead fibers, spaced throughout the paste such that the fibers do not contact each other. The fibers are of relatively short length and are obtained by chopping lead wool. This paste is deposited on a frame made of a plastic resin to form the positive electrode, which is then assembled to a negative grid and inserted into the battery case, resulting in a battery which contains only about 29% less lead than many conventional batteries and which has a somewhat improved specific energy.

U.S. Pat. No. 4,110,241 discloses a method for making an active material reinforced with synthetic fibers. This reinforcement may increase the durability of the battery, but has little effect on its capacity or specific energy.

Similar problems of battery life, capacity and weight are encountered in other types of batteries, and attempts to improve these batteries, for the most part, represent adaptations of the above-described balancing formula to the specific type of battery. For instance, U.S. Pat. No. 3,770,507 discloses a resinous grid impregnated with lead dioxide and synthetic fibers for use in non-rechargeable primary batteries using fluoroboric acid as an electrolyte. U.S. Pat. No. 3,397,088 discloses an electrode that is enveloped in fibrous inorganic material such as potassium titanate paper and compressed so that the active material is forced into the pores of the fibrous sheet. Alternatively, the fibers may be dispersed throughout the active material. This improvement has particular application to high energy density and rechargeable batteries using cadmium and nickel or silver. U.S. Pat. No. 3,703,413 discloses a method of making inorganic fibers, such as zinc oxide fibers, which may be incorporated into the electrodes of zinc-containing batteries. None of these approaches have application to metal acid batteries, particularly lead acid batteries. And, like the approaches-summarized above, all represent a trade-off between durability, capacity and specific energy.

Another approach which has been used to decrease the weight of the lead acid battery is to utilize a lead alloy in the electrode. Lead alloys such as antimony may be used to give strength to the battery's electrodes, but such batteries are still relatively heavy and the presence of the alloy may result in increased corrosion and gassing. For instance, although antimony adds strength to the electrode and increases the resistance of the grid to shedding of the active material under deep cycling, it is highly susceptible to corrosion and gassing. Further, the presence of antimony is undesirable because it promotes self-discharging. Calcium alloy is not as susceptible to corrosion, but the presence of calcium reduces the electrical conductivity of the grid by causing a calcium-based plaque to form around the positive grid conductors. This plaque formation is non-reversible and increases with age and the number of battery charge-discharge cycles, causing a gradual and permanent decrease in battery capacity.

Although all of these approaches have their merits, all represent a trade-off between weight, capacity and durability, and as far as is known, none have provided the light-weight, long-life battery necessary to allow the commercialization of such developments as the electrically-powered automobile on a large scale.

One approach which could provide significant weight reduction without impairment of the capacity and durability of the battery is the coating of a light-weight, high tensile strength fiber with sufficient lead such that the resulting composite wire would be suitable for use in the grid of the electrode. For instance, U.S. Pat. No. 3,808,040, summarized above, notes that the method for strengthening a conductive latticework disclosed by that patent may be used on a tissue of lead-coated glass fibers. However, to date, no wire with a coating of lead of sufficient thickness, purity and continuity has been available. As noted above, pure lead wire is not strong enough to use in lead acid batteries, and previous attempts at coating stronger materials with lead have been unsuccessful in making a product which may be used in such a battery. For instance, U.S. Pat. No. 275,859 discloses an apparatus for the extrusion of lead onto a core material, in particular, a telegraph cable. However, the apparatus disclosed in that patent is not capable of developing the high extrusion pressures necessary to extrude lead onto a core material of small enough diameter to be capable of being used for this purpose. The problem is complicated by the fact that there are few materials with the desired characteristics of high corrosion and high tensile strength, among others, which can survive chemical attack in a lead oxide-sulfuric acid battery.

Short fibers composed only of lead are disclosed in U.S. Pat. No. 3,466,193, also summarized above. U.S. Pat. No. 3,556,855 discloses the use of metal-coated fibers in an electrode, but the fibers are of short length and are prepared using an electroless plating process, a method which does not provide the thickness and continuity of coating required, particularly in the case of the deposition of a lead coating, to make a grid from such a wire. The patent does disclose the, mixing of a thermosetting resin with fibers coated by electroless deposition to form a grid element.

U.S. Pat. No. 4,169,911 discloses short, metal-coated carbon fibers held together by a binder for use in battery electrodes, and notes that lead is one of the metals which may be used to coat the fibers. It indicates that the fiber may be coated by electrochemical plating, chemical plating, vacuum deposition, sputtering, ion plating, plasma jet application or chemical deposition. However, none of these methods can be used to produce a lead-coated wire capable of being woven into a scrim which may be used as an electrode grid. The fibers disclosed by this reference are characterized by a conductivity which is too low, due to the thinness of the layer of metal deposited on the fiber, for such a use. Nor do the metal-coated fibers produced by such processes possess the necessary surface characteristics (i.e., uniform, small grain size) to resist corrosion in a lead-acid environment. Further, the strength of the porous material disclosed by this reference is too low to support the layer of active material of the electrode.

U.S. Pat. No. 3,776,612 discloses short carbon or asbestos fibers plated with lead for use as a bearing material. Although the conductivity of these fibers may be adequate for batteries which are used in certain applications, the relatively thin plating would be oxidized rapidly in the harsh environment of the lead acid battery, resulting in broken electrical continuity rendering the battery useless. Further, the process disclosed by this reference for the making of such fibers is relatively slow and expensive.

The electrodeposition of metal, including lead, onto synthetic polymer fibers using a metal chloride nitrate or sulfate solution is disclosed by U.S. Pat. No. 3,940,533. Such fibers show improved conductivity and antistatic properties. Again, the thinness of the lead coating precludes the use of this material as the grid conductor of a battery. Further, the fibers disclosed would not survive the sulfuric acid and lead oxide attack of the lead acid battery.

U.S. Pat. No. 3,958,066 discloses a method of making synthetic polymer fibers with a metal powder attached to their surface for improved conductivity and antistatic applications. Such a fiber is useless in a lead acid battery because the synthetic polymer would not survive the chemical environment of the battery and because pure lead, not particles of lead, must form a continuous coating on the fiber in order to avoid rapid oxidation of the lead and to provide the necessary electrical conductivity.

U.S. Pat. No. 2,963,739 discloses an apparatus and method of applying metal to glass filaments. Glass fibers are drawn through a bead of molten metal which forms at the face of an applicator, then stranded and spooled. The apparatus is apparently intended for the coating of glass fibers with copper, aluminum, silver or alloys of these metals, but is, however, unsatisfactory for coating of lead or zinc onto metal wire or glass fibers. Both melted lead and melted zinc have high surface tensions and poor wetting characteristics. When those characteristics are added to the fact that, when melted, both oxidize easily and have a poor affinity for glass, the result is an impure and irregular coating which is unsatisfactory because of the effect of those impurities and irregularities on the electrical conductivity of the coated wire and because those impurities and irregularities expose the core of the composite wire to the acid of the lead acid battery, resulting in damage to the core. To a lesser extent, this same problem exists with regard to the coating of a core material with nickel or zinc.

Another approach which can be utilized to reduce the weight of the battery while improving its electrical characteristics is to make the conductor, or bus bar, which removes current from the grid, and/or which passes current from grid to grid within the battery, lighter and to improve its conductivity so that a proportionally smaller conducter can be utilized. Those objectives could also be accomplished by providing a composite wire with a core made of a conductive metal such as copper or aluminum and a thin coating of lead. However, so far as is known, no composite wire is available to satisfactorily provide such a reduction in weight or size.

Taking advantage of the fact that only the outermost layer of the lead of the grid element is necessary for proper function of the electrodes of a metal acid battery, the present invention provides a continuous metal coated, composite wire of small diameter. This wire may be woven into a scrim in a wide variety of shapes and sizes for use as a grid which may be used in an electrode in an electrochemical cell. Such a grid is characterized by the desired properties of strength, durability, corrosion-resistance, conductivity and light weight. It is, therefore, an object of the present invention to provide a lightweight, metal coated fiber wire of small diameter and continuous length.

It is another object of the present invention to provide a lightweight, lead coated wire with the high tensile and shear strength and corrosion resistance necessary to allow the use of the wire in the electrode of an electrochemical cell.

It is another object of the present invention to provide an apparatus and method of making a metal-coated wire, the surface of which is characterized by extremely high corrosion resistance properties arising from precisely controlled, solid-phase extrusion of the metal coating onto a core of a fibrous material, optical fiber or highly conductive metal.

It is another object of the present invention to provide a material from which a grid for an electrochemical battery may be made which will extend the life and reduce the weight of the battery.

It is another object of the present invention to provide a material from which a grid for an electrochemical battery may be made which will increase the specific energy of the battery.

It is another object of the present invention to provide a method for making a metal coated fiber.

A further object of the present invention is to provide a method for coating a fibrous material with an extrudible, corrosion-resistant metal such as lead, zinc or nickel.

It is another object of the present invention to provide a method for making a continuous length of a fine core material with a layer of lead deposited around the core material.

A further object of the present invention is to provide an apparatus for use in the coating of a fine, high tensile strength fibrous material with an extrudible, corrosion-resistant metal.

It is another object of the present invention to provide an apparatus capable of depositing a thin layer of lead, zinc, nickel or other corrosion-resistant metal around a fine core material.

It is another object of the present invention to provide an apparatus capable of depositing a thin layer of extrudible, corrosion-resistant metal around a core material, the corrosion-resistance properties of the metal being enhanced due to the uniform, small grain size of the metal.

It is another object of the present invention to provide an apparatus which is capable of making continuous lengths of light weight, lead coated wire of small diameter.

It is another object of the present invention to provide a light-weight, high tensile strength, metal-coated wire of small diameter, the wire having high corrosion resistance capabilities due to the uniform, small grain size of the surface of the metal Still another object of this invention is to provide a light-weight, durable fabric woven from a metal coated fiber.

Another object of the present invention is to provide a fine, high tensile strength, lead-coated wire which may be woven into a scrim for use in the electrode of a lead acid battery.

Another object of the present invention is to provide a composite wire comprising a core of a variety of materials, including highly conductive metals such as copper or aluminum, and a coating of an extrudible, corrosion-resistant metal such as lead, zinc or nickel.

Another object of the present invention is to provide an improved electrode grid constructed of a scrim woven from a lightweight, high tensile strength fiber coated with lead and a bus bar constructed from a core of a highly conductive metal such as copper or aluminum and a coating of lead.

Another object of the present invention is to provide electrode grids of high conductivity, light weight and increased durability for use in an electrochemical battery.

Another object of the present invention is to provide connectors and cell interconnect cabling of high conductivity and light weight for use in an electrochemical battery.

Another object of the present invention is to provide an electrode composed of a combination of a fabric woven from a lead coated fiber and a paste of active material for use in a lead acid battery.

Another object of the present invention is to provide an electrochemical cell which may be assembled into an electrochemical battery that is light in weight, has a long battery life and has a high specific energy.

A further object of the present invention is to provide a method of making an electrode grid of high conductivity, light weight and increased durability.

Another object of the present invention is to provide a battery in which the interplate and intercellular interconnectors are eliminated.

Yet another object of the present invention is to provide a high tensile strength conductor which will pass high currents but will blow easily in response to high transient currents, thereby serving as a fusing material.

Another object of the present invention is to provide a cabled composite wire comprising several individual fine composite wires having either a fibrous material core or a highly conductive metal core and a coating of an extrudible, corrosion-resistant metal such as lead, zinc or nickel, each and all of the composite wires being contained within an extruded lead sheath.

Another object of the present invention is to provide a light-weight cloth woven from a lead coated, composite wire useful to absorb ionizing and/or electromagnetic radiation or for noise abatement.

Another object of the present invention is to provide a lead coated, composite wire having an optical fiber core for use in shielded fiber optic communications circuits.

Various other objects of the present invention and the advantages it represents will be readily apparent from the following description of the drawings of the apparatus of the present invention, in which exemplary embodiments of the invention are shown, and the description of the method of the present invention.

SUMMARY OF THE INVENTION

The present invention is directed to a method and apparatus for coating a high tensile strength fibrous material, optical fiber or a highly conductive metal wire with an extrudible, corrosion-resistant metal such as lead, zinc or nickel, a method of making such a metal-coated wire, and a metal-coated wire of high tensile strength and electrical conductivity made according to that method and with that apparatus. The apparatus comprises die means for receiving a high tensile strength core, a compression chamber in communication with the die means, and means for forcing the metal out of the compression chamber and through the die means. A cylinder is also provided comprising a compression chamber with a piston reciprocally mounted therein, the radial clearance between the piston and the walls of the compression chamber being virtually zero. In order to achieve this zero radial clearance, spaced, annular lands are provided on the piston between the body of the piston and the walls of the compression chamber; the piston, the annular lands and the inside walls of the compression chamber defining a space. Also provided is a means communicating with the compression chamber and the space defined by the piston, the annular lands and the walls of the compression chamber operable to allow the extrudible, corrosion-resistant metal to be extruded into said space during the compression stroke of the piston, thereby relieving the high extrusion pressure exerted on said metal and preventing the escape of said metal past the piston along the walls of the compression chamber.

The apparatus is provided with a die holder assembly comprising a first die member with an aperture in it for passage of a fibrous or metallic core material that is tapered in the direction of movement of the core material and a second die member with an aperture in it for passage of the core material that is tapered in the direction opposite the direction of movement of the core material. The first and second die members are retained by a cylindrical die separator with a portion at both ends which is larger in diameter than the central portion. The die holder assembly is provided with means communicating with a source under pressure and means operable to equalize the pressure exerted by the extrudible, corrosion-resistant metal which is forced into the die separator around the core material to achieve a coating on the core material of uniform thickness.

According to the method of the present invention, an extrudible, corrosion-resistant metal such as lead, zinc or nickel is extruded through a die means and a core material such as a fine aluminum, copper, silver, gold, nickel or tantalum or high tensile strength fibrous material is drawn through the die means as the metal is extruded. Using this method, continuous lengths of a metal wire or a fiber such as an aramid, or fiberglass, carbon or optical fiber can be coated with an uniform layer of the extrudible, corrosion-resistant metal.

The present invention is also directed to a scrim which may be woven from the metal coated wire produced by the method and apparatus of the present invention, the electrode which may be constructed using such a scrim as a grid element, and the battery which may be constructed from positive and negative pairs of such electrodes. Also described is a composite wire comprising a core of a highly conductive metal and a coating of lead, zinc or nickel, an electrode which may be constructed of a scrim woven from the metal coated, composite wire having either a fibrous core material or a highly conductive metal core and a bus bar comprised of a highly conductive metal and a coating of lead, zinc or nickel and the electrochemical cell which may be constructed from a positive and negative pair of such electrodes.

The present invention is also directed to a rechargeable lead acid electrochemical cell having spiral wound positive and negative electrode pairs, the electrodes being constructed using a scrim woven from the metal coated wire produced according to the method of the present invention as a grid element. Several of these electrochemical cells may be assembled into a rechargeable lead acid battery, the electrode pairs being connected in series, and the connections may be in the form of bus bars constructed of a composite wire comprising a core of a highly conductive metal and a coating of lead.

BRIEF DESCRIPTION OF THE DRAWINGS

FIG. 3 is a cross-sectional view of the die assembly of the apparatus shown in FIG. 1.

FIG. 4 is an exploded, perspective view of the die assembly of the apparatus shown in FIGS. 1 and 2.

FIG. 5 is an enlarged longitudinal cross section of the piston which forces the metal out of the compression chamber and into the space between dies.

FIG. 6 is an elevated, perspective view of a positive electrode which may be constructed from a scrim woven with the lead coated wire produced according to the method and with the apparatus of the present invention.

DETAILED DESCRIPTION

When used herein, the term "extrudible, corrosion-resistant metal" refers to those metals which are capable of being extruded onto a core material using the method and apparatus of the present invention at temperatures below the melting points of those metals. Although other metals may be known to those skilled in the art who have the benefit of this disclosure, the presently preferred extrudible, corrosion-resistant metals are lead, zinc and nickel, with lead being the most preferred.

The term "core material", as used throughout the specification and claims, refers to fibrous and metallic materials. The fibrous materials may be glass, synthetic, optical or carbon fibers. The glass fibers may be any one of a variety of commercially available fiberglass fibers, and the synthetic fibers may be an aramid or other commercially available synthetic fiber. The optical fibers may be any of a number of proprietary glass fiber formulations used for conduction of light pulses in telecommunications. The metallic materials which are used as core materials are those highly conductive metals such as aluminum, copper, silver, gold, nickel or tantalum.

Figure 1:
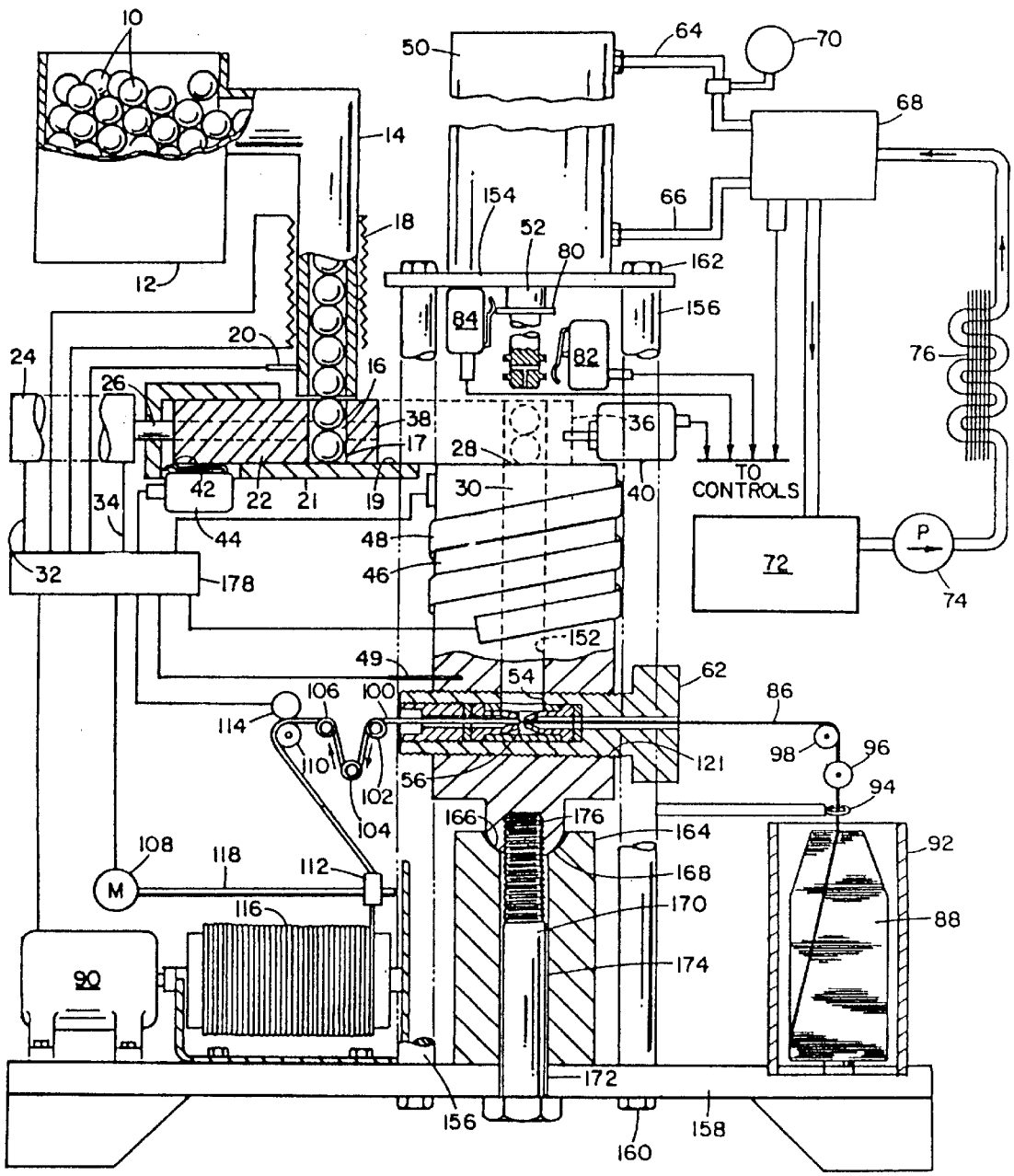
FIG. 1 is a front view of the apparatus of the present invention showing the mechanism for feeding the metal into the compression cylinder, the die holder assembly and the portion of the piston which forces the lead into the space between dies, in longitudinal cross section.

In FIG. 1, a preferred embodiment of the apparatus of the present invention is shown. Pure extrudible, corrosion-resistant metal such as the lead balls 10 is loaded into the vibratory feeder 12 for feeding through the chute or conduit 14 into the chamber 16 formed by a bore 17 through plunger 22 and the upper surface 19 of slide 21. The lead balls 10 in conduit 14 are heated to a predetermined temperature by preheating coil 18, controlled by thermocouple 20. Plunger 22, connected to the reciprocating feed cylinder 24 by means of the piston rod 26, is initially in its retracted position, allowing a plurality of heated lead balls 10 to drop into the chamber 16. When activated, feed cylinder 24 reciprocates the plunger 22 to move the lead balls 10 retained within chamber 16 along the upper surface 19 of slide 21 over the aperture 28 in the top of compression chamber 30. Feed cylinder 24 is air powered by air input line 32 and output line 34. The cylinder could also be hydraulically powered or connected to an electrical solenoid.

When the plunger 22 reaches the position shown in dotted lines 36, the end of the plunger 38 contacts limit switch 40, stopping plunger 22 and reversing the direction of its travel, returning it to its initial position. In the moment while the plunger 22 is in the position shown by dotted lines 36, the chamber 16 is positioned over the aperture 28 in the top of the compression chamber 30, allowing the lead balls in the chamber 16 to drop through aperture 28 into compression chamber 30. When the plunger 22 returns to its original position, the corner 42 of plunger 22 contacts limit switch 44, stopping the travel of the plunger 22 and reversing it for another stroke.

In the compression chamber 30, the lead or other extrudible, corrosion-resistant metal may be heated by heat imparted to the walls of the compression chamber 46 by the heating coil 48 under control of thermocouple 49. Once the metal is heated to a predetermined temperature, the hydraulic cylinder 50 is actuated, causing piston 52 to descend from its initial position down into the compression chamber 30 through aperture 28, forcing the metal out of the chamber through aperture 54 and into the space 56 between the entry die 58 and the exit die 60, held in place by die holder 62, and shown in more detail in FIG. 3 Die holder 62 is threaded into threaded aperture 121 in the walls 46 of the compression chamber 30.

The hydraulic cylinder 50 is actuated by fluid pressure developed through input line 64 and output line 66. The lines 64 and 66 are provided with a proportional control valve 68 and a pressure gauge 70. Hydraulic fluid is pumped from the reservoir 72 by pump 74, through oil cooling radiator 76 to the proportional control valve 68. When the piston 52 reaches the position shown in dotted lines 78, best shown in FIG. 2, collar 80 contacts limit switch 82, stopping the piston 52, reversing the direction of its travel and returning it to its original position. When piston 52 reaches its original position, collar 80 contacts limit switch 84, stopping the travel of the piston 52 and reversing it for another stroke.

Compression of the metal by the piston 52 inside the compression chamber 30 generates heat. Thermocouple 49 senses the temperature in the compression chamber 30 and regulates the heating of the walls 46 of the compression chamber 30 by the heating coil 48.

Figure 2:
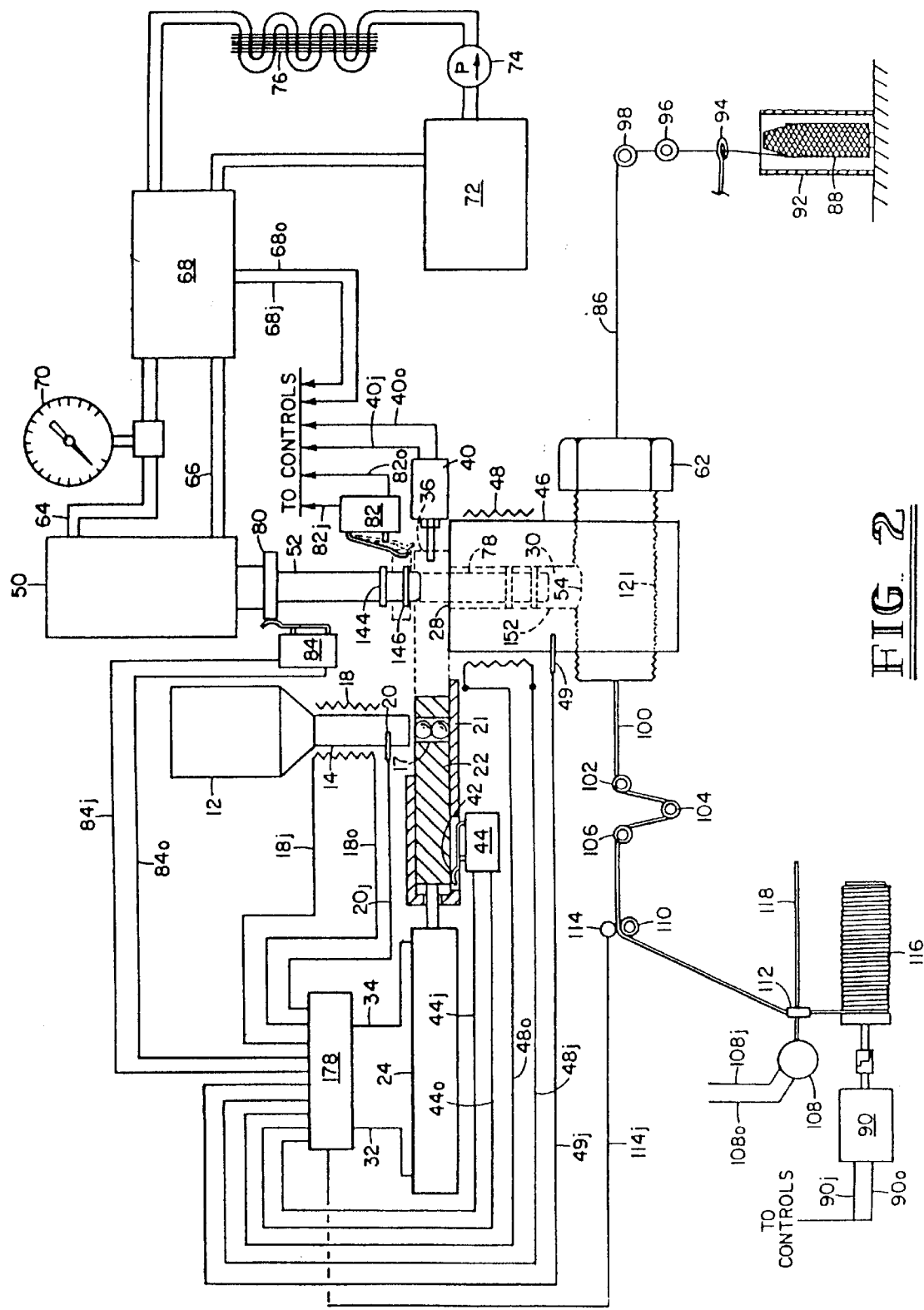
FIG. 2 is a schematic representation of the apparatus of the present invention showing the control system plan.

Core material 86, which may be "E glass" or "C glass" type fiberglass or other suitable fiber such as an optical, carbon or synthetic fiber, or a fine wire comprised of a highly conductive metal such as copper or aluminum, may be maintained at a predetermined tension as it is pulled off the reel 88 by a constant tension motor-control assembly such as that shown schematically in FIGS. 1 and 2 at 90. As core material 86 is pulled off the reel 88, the shield 92 around the reel 88 helps prevent core material 86 from tangling and shields it from any loose objects that may be near the reel 88. Core material 86 is pulled off the reel 88 through a centering ring 94, and drag tension is supplied by spring tensioner 96 to prevent fiber tangling. Roller 98 guides core material 86 toward the entry die 58 and exit die 60, where it is coated with metal to form a fine, composite wire 100. As the wire 100 exits from the die holder 62, it traverses roller 102, turning it downward to traverse floating weight 104, which turns it back up to roller 106, thereby helping to maintain constant tension during starting and stopping of the motors 90 and 108. The term "wire" is used, with reference numeral 100, to designate the composite wire which results from the coating of core material 86, whether it is a fibrous material or a highly conductive metal wire, with an extrudible, corrosion-resistant metal such as lead, zinc or nickel. Roller 110 then guides the wire 100 towards the traversing means 112. As the wire 100 traverses roller 110, proportional velocity encoder 114 measures its speed and cooperates with traversing means 112 and motors 90 and 108 to wind the wire 100 onto the take-up spool 116. The traversing means 112 moves back and forth along the traverse bar 118 to insure even winding of the wire 100 onto the take-up spool 116.

Referring now to FIGS. 3 and 4, entry die 58 and exit die 60 are retained within die separator 120 by spacing washers 122a and 122b. Die separator 120 is retained within the cavity 65 in the die holder 62, and compression is provided by the tightening of the retaining plug 124 in the threads 123 in the die holder 62. Entry die 58 is provided with flange 59 and exit die 60 is provided with flange 61, the flanges 59 and 61 abuting the ends 119 of the die separator 120, thereby maintaining the spacing between the dies in the interior 56 of the die separator 120. Die holder 62 is provided with an aperture 126 which, when the die separator 120, entry die 58, exit die 60, and spacing washers 122 are assembled into the die holder 62, will be aligned with the aperture 128 in the die separator 120. Aperture 126 is sized to fit snugly against aperture 54 on the bottom of the compression cylinder 30 when die holder 62 is screwed on threads 119 into the threaded aperture 121 in the wall 46 of the compression cylinder 30.

Die holder 62 is also provided with aperture 130 for passage of core material 86 (not shown). Entry die 58 is provided with an aperture 132 at the apex of the taper 134. Metal is forced out of compression chamber 30 by piston 52, through apertures 54, 126 and 128, and into the space 56 between the entry die 58 and exit die 60.

The exit die 60 is provided with an exit aperture 136 at the apex of the conical taper 138. The taper 134 of entry die 58 is tapered in the direction of the movement of the core material 86. The taper 138 of exit die 60 is preferably tapered in the direction opposite the direction of movement of core materials 86, but can be tapered in the same direction as the movement of core material 86, or not tapered at all. Tapering the exit die 60 in the direction opposite the direction of movement of core material 86 is preferred because, even though other configurations may allow the use of decreased extrusion pressures, the tooling life and concentricity of the core material 86 in composite wire 100 suffers. Further, retaining plug 124 must be torqued more tightly into threads 123 against the washers 122 and flanges 59 and 61 of entry die 58 and exit die 60, respectively, because of the increased pressure exerted against the exit die 60 by the metal in space 56, if the exit die 60 utilized is not tapered in the direction opposite the direction of movement of core material 86. Retaining plug 124 is also provided with aperture 140 for passage of wire 100.

Figure 11:
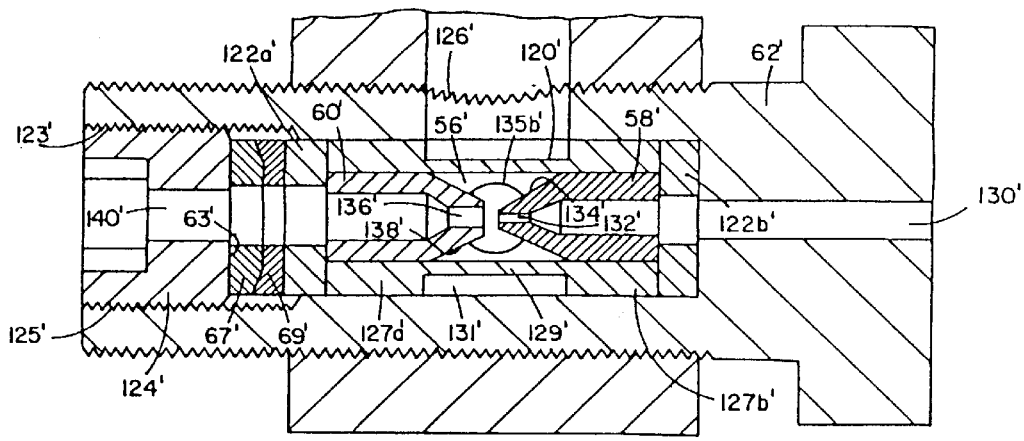
FIG. 11 is a cross-sectional view of an alternative embodiment of the die assembly shown in FIG. 3.
Figure 12:
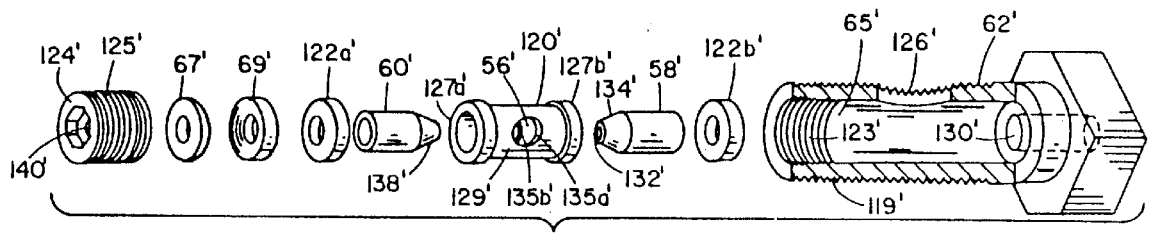
FIG. 12 is an exploded, perspective view, of the die assembly of FIG. 11.

Referring to FIGS. 11 and 12, there is shown a presently preferred embodiment of the die assembly of FIGS. 3 and 4 in which the various components are, to the extent possible, given reference numerals and descriptive names corresponding to those of the components shown in FIGS. 3 and 4. In particular, the entry die 58' and exit die 60' are retained within die separator 120' by back-up washers 122a' and 122b', and compression is provided by the tightening of the retaining plug 124' into the cavity 65' in the die holder 62' on the threads 123'. Because the retaining plug 124' is provided with threads 125' on which it is threaded into cavity 65' in die holder 62', it may have a slight cant to the face 63', which could result in the skewing of the exit die 60' within the die separator 120'. To prevent any such skewing, a thrust washer assembly having a convex face washer 67' and a concave face washer 69' is interposed between the retaining plug 124' and the back-up washer 122b'. The interaction of the concave and convex surfaces of washers 67' and 69' effectively prevents any skewing which may result from the tightening of retaining plug 124' against back-up washer 122a'.

The die holder 62' is provided with aperture 126' which is sized to fit snugly against the aperture 54 on the bottom of compression cylinder 30' (see FIGS. 1 and 2). Die separator 120' is provided with flanges 127a' and 127b' at each end, and a central portion 129' of smaller diameter, the diameter of flanges 127a' and 127b' being approximately the same as the inside diameter of the cavity 65' in the die holder 62' which receives die separator 120'. The combination of flanges 127a' and 127b' and the smaller diameter of central portion 129' of die separator 120' leaves a space 131' between the central portion 129' of die separator 120' and the inside wall of cavity 65' in die holder 62'. Space 131' is in fluid communication with the interior 56' of die separator 120' by means of apertures 135a' and 135b'.

Because of the pressure exerted by the pressurized material in space 56' against the entry die 58' and exit die 60', there is no need for flanges on the dies 58' and 60' such as the flanges 59 and 60 shown in FIGS. 3 and 4. In order to retain the dies within the space 56' in die separator 120' during transit, and to insure the axial alignment of the dies, the diameter of the dies is approximately 0.0005 inches larger than the diameter of the inside walls of the interior 56' of die separator 120 and the dies are pressed fit into die separator 120' using heat, oil and a hydraulic press.

Die holder 62' is also provided with aperture 130' for passage of core material 86 (not shown). Entry die 58' is provided with an aperture 132' at the apex of the taper 134'. Exit die 60' is provided with an exit aperture 136' at the apex of the conical taper 138'. Retaining plug 124' is also provided with aperture 140' for passage of wire 100.

The embodiment shown in FIGS. 11 and 12 is characterized by the fact that the pressure exerted on core material 86 as it passes through space 56 is equal in all directions. When producing small diameter composite wire with an apparatus such as is shown in FIGS. 3 and 4, the core material does not stay centered within the space 56 relative to the aperture 136 in exit die 60 as a result of the differential pressure exerted on core material 86 from above as the lead is forced through apertures 126 and 128. This differential pressure forces core material 86 downwardly such that it no longer enters the aperture 136 in the exit die 60 in the center of that aperture 136, causing the core material 86 to be off-center in the composite wire 100. This differential downward pressure may also be sufficient to cause the deformation of the tooling in the die carrier 62.

The high extrusion pressure is the result of the economy afforded by high production speeds. To maximize production efficiency and reduce the need to reload the compression chamber, a larger diameter compression chamber 30 (approximately 0.625 inches) and piston 52 are used. A small diameter chamber and piston would require frequent stopping of the apparatus for reloading. However, when producing a 0.015 inch diameter composite wire with a 0.010 inch glass core, the large diameter of the chamber and piston causes the reduction ratio to exceed 3100 to 1. The use of a compression chamber of very long length and small diameter would result in less frequent reloading and a decrease in reduction ratio, but is not preferred because of the problems of alignment of the piston and compression chamber and the lack of stiffness in a long piston.

This high pressure is also a result of the mathematical fact that extrusion pressure is not a linear function of the reduction ratio, consequently extrusion pressure increases at a rate greater than the proportional increase in the reduction ratio. High extrusion pressures create design problems which are overcome in the present invention. For instance, it is known that when reduction ration exceeds 250:1, the extrusion pressure will be so high that it will exceed the capability of the walls of the compression chamber to retain their shape even if the walls are constructed of high strength steel. Such high extrusion pressures can actually cause the walls of the chamber to bow outwardly as the piston is urged against the metal in the chamber, allowing the metal to escape past the piston, creating the problems which result from such leakage that are discussed below. The bowing of the cylinder walls is particularly pronounced when the piston is approximately half way down the cylinder. To prevent this bowing of the walls of the compression chamber, multiple concentric cylinders (not shown) are used as the walls of the compression chamber. In a presently preferred embodiment, as many as four cylinders, the outside diameter of each being approximately 0.001 inches larger than the inside diameter of the adjacent, surrounding cylinder, are pressed one into the other to form the walls of the compression chamber.

To minimize the loss of this extremely high extrusion pressure, thereby avoiding the use of even higher pressures to achieve the desired pressure in the space 56, the exit die 60 is placed directly beneath the compression chamber 30, resulting in the differential pressure across the apertures 126 and 128 and the deflection of the core material 86 downwardly in space 56. To minimize this differential pressure, while still minimizing the extrusion pressure required, the presently preferred construction of FIG. 11 is utilized. Exit die 60' is located directly below compression chamber 30, but metal is admitted into the space 56 in two directions which are 180 degrees apart, thereby equalizing the pressure exerted against the core material 86. Material is forced out of compression chamber 30 by piston 52, through apertures 54 and 126', into the space 131', around the central portion 129' of die separator 120', through apertures 135a' and 135b', and into the space 56' between entry die 58' and exit die 60'. Additional apertures may be provided so long as they are spaced at regular intervals around the central-portion of die separator 129' and so long as none of the apertures is located directly under the aperture 54 at the bottom of the compression chamber 30. Using the embodiment shown in FIGS. 11 and 12, the concentricity of the core material relative to the outside diameter of the composite wire 100 can be maintained to within ±5%.

Piston 52 is shown in enlarged detail in FIG. 5. The piston 52 is provided with a beveled surface 142 on the bottom of the piston 52. The piston 52 is also provided with annular lands 144 and 146, and a transverse hole 148 through the piston. Vertical hole 150 communicates with transverse hole 148. Beveled surface 142, lands 144 and 146, transverse hole 148 and vertical hole 150 cooperate to help seal piston 52 along the inside wall 152 (FIG. 1) of compression chamber 30 and to help center the piston 52 in the compression chamber 30 during the compression stroke of piston 52. Metal under high pressure is forced up through vertical hole 150 into transverse hole 148 and into the space formed by lands 144 and 146 and the inside wall 152 of the compression chamber 30 effectively sealing piston 52 against the wall 152 and centering it within the compression chamber 30.

This sealing construction is made necessary by the high extrusion pressure of the appartus. For instance, even though the clearance between the piston 52 and the inside wall 152 of compression chamber 30 can be made as small as 0.0005 inches, that much radial clearance is enough to allow excessive leakage of the extrudible, corrosion-resistant metal past piston 52 during compression, and the concommitant loss of usable extrusion pressure. Because of the small diameters of the composite wires which may be produced using the method and apparatus of the present invention, if this sealing construction is not used, as much as ten times more metal can leak past the piston 52 than is applied to the core material. In addition to the fact that this leakage results in the use of more metal (although the leakage can be recycled) and therefore requires more frequent reloading of compression chamber 30, thereby slowing production, this leakage is generally asymmetrical, causing the piston 52 to be pushed off center in compression chamber 30 and into contact with the wall 152. This contact results in the immediate scoring of the walls 46, causing even greater leakage and loss of extrusion pressure. It is for this reason that the extremely long, small diameter compression chamber discussed above has proved to be of little aid in overcoming the need for frequent reloading of the chamber: the alignment and rigidity problems associated with such a construction multiply the problems of centering the piston in the chamber, thereby exacerbating the leakage of metal past the piston. In addition to the damage caused, the increased leakage and decreased extrusion pressure causes a drop in the maximum production rate, all of which are limitations which make the sealing construction of the piston 52 a central feature of the apparatus of the present invention.

The construction shown in FIG. 5 allows the extrudible, corrosion-resistant metal to flow into the space formed by piston 52, lands 144 and 146, and the inside wall 152 of compression chamber 30. The metal which extrudes into this space lacks the pressure needed to extrude past annular land 144, effectively preventing leakage past piston 52.

Additionally, the metal which extrudes into the space formed by piston 52, lands 142 and 144, and wall 152 is, depending on the extrusion pressure, pressurized to between about 5,000 and 10,000 PSI. Generally, it appears that the pressure of the metal in this space will vary from approximately one fourth to one third of the pressure of the compression chamber 30. This pressure is exerted between piston 52 and wall 152 equally around the piston 52, forcing piston 52 to the center of compression chamber 30 and further preventing contact between the piston 52 and wall 152. At the same time, the metal in this space provides what amounts to a low friction bearing surface which is similar to a babbit bearing, reducing piston drag and leaving more hydraulic force for extrusion. Pistons with seals constructed in this manner have been tested for several months. After millions of cycles, no sign of wear or leakage has appeared, and the piston and cylinder wall are unscored even after heavy use, all of the extrudible, corrosion-resistant metal having been applied to the core material.

The use of a long, small diameter compression chamber would most likely obviate the need for the sealing construction of piston 52 since the small diameter of the chamber 30 would reduce the reduction ratio to a point at which it would not develop the 40–50,000 PSI extrusion pressures required by the preferred embodiment of the present invention to maintain efficient production rates. In fact, the use of a long, small diameter compression chamber has such an effect on extrusion pressure that it would likely permit the use of a straight piston without any seals. However, the aforementioned alignment, stiffness and centering problems associated with such a construction are such serious limitations as to limit the utility of that construction.

Hydraulic cylinder 50 is mounted on platform 154, supported above base 158 by columns 156, and held in place by bolts 160 and 162. Slide 21 is mounted to columns 156 and serves as a support for feed cylinder 24 and its piston rod 26 and plunger 22. Compression chamber 30 is supported by table 164 and is provided with a downwardly projecting hemispherical ear 166 which is received within cavity 168 of table 164. Bolt 170 projects up through a hole 172 in the base 158 and hole 174 in table 164 and is received in the threaded aperture 176 of the hemispherical ear 166. The inside radius of cavity 168 is slightly larger than the radius of hemispherical ear 166 such that when compression chamber 30 is screwed onto bolt 170, cavity 168 and hemispherical ear 166 will cooperate to center the compression chamber on table 164 so that aperture 28 is in axial alignment with bore 17 when plunger 22 is in the extended position shown by the dotted lines 36 in FIG. 1 and in axial alignment with piston 52 when plunger 22 returns to its initial position.

Referring now to FIG. 2, operation of the apparatus of the present invention is controlled from control panel 178 by appropriate circuitry. Control panel 178 is connected to feed cylinder 24 by input line 32 and output line 34. Proportional control valve 68 is connected to the control panel 178 by input line $68_i$ and output line $68_o$, thereby controlling hydraulic cylinder 50. Limit switches 40, 44, 82, and 84 and motors 90 and 108 are connected to control panel 178 by the respective input and output lines $40_i$ and $40_o$, $44_i$ and $44_o$, $82_i$ and $82_o$, $84_i$ and $84_o$, and $108_i$ and $108_o$, and $90_i$ and $90_o$. Inputs to the control panel 178 are received from the thermocouples 20 and 49 through lines $20_i$ and $49_i$, respectively, and preheating coil 18 and heating coil 48 are controlled on the basis of that input through respective input and output lines $18_i$ and $18_o$ and $48_i$ and $48_o$. Input is also received from proportional velocity encoder 114 by means of line $114_i$. In this manner, all operational parameters may be set and controlled before and/or during operation of the apparatus of the present invention.

An important characteristic of the continuous, composite wire of the present invention is its resistance to corrosion from attack by the acid of a battery or, in the case of fiber optic communications cables, the harsh environment in which the cable will be used as described below. As a general rule, the smaller the grain size of lead, for instance, the greater its resistance to corrosion. The large grain size does not itself cause corrosion, but when corrosion starts, it attacks the grain boundaries, and small grain size reduces the susceptibility of the grain boundaries to attack. The method and apparatus of the present invention result in the extrusion of lead of high corrosion resistance at least partly because of the small grain size produced.

When lead is cast and then solidified, the average grain size is approximately 0.25 inches. Using the method and apparatus of the present invention, the average grain size of the lead is approximately $0.25 \times 10^{-6}$ inches as determined with the scanning electron microscope.

The method of the present invention may be better understood by reference to the following examples.

EXAMPLE I

For use in Example I, the apparatus of the present invention was provided with an entry die with an aperture of approximately 0.013". The aperture in the exit die was approximately 0.020" in diameter, and the distance between the end of the entry die and entrance of the exit die was set at approximately 0.006".

Lead balls were loaded into vibratory feeder, vibrated into the conduit for preheating, and then allowed to feed into the compression chamber, where the lead was heated further and the temperature in the chamber allowed to stabilize at approximately 450° F. With the constant tension motor-control assembly pulling the fiber to keep it from tangling, the fiber was moved through the dies at a rate of approximately 100 feet per minute while the lead was extruded at a pressure of approximately 40,000 pounds per square inch (PSI), plus or minus 25%. When measured at the apex of the exit die aperture, the temperature of the lead was approximately 585° F.

Using this method, a commercially available aramid fiber, marketed under the trade name "KEVLAR 49", was used as a core fiber to produce a fine, continuous, composite, electrically conductive wire of a diameter of approximately 20 mils. The thickness of the lead around the fiber core was approximately 5 mils.

EXAMPLE II

The same operating procedure was used to coat a commercially available chemical glass yarn known in the industry as "C glass". Production rates of from 150 to 300 feet per minute were utilized at extrusion pressures of 40,000 to 50,000 PSI, plus or minus 25%. When "C glass" is used as the fiber core of a lead coated wire, the composite wire produced according to this procedure has a diameter of approximately 0.025 inches and the thickness of the lead coating is approximately 0.006 inches.

EXAMPLE III

The same operating procedure was used to coat a commercially available C glass of 0.010 inches in diameter, resulting in a composite wire with an outside diameter of 0.015 inches. An entry die with an aperture of approximately 0.012 inches in diameter was used with an exit die with an aperture of about 0.015 inches, and the space between the dies was about 0.003 inches. Extrusion pressures of from about 40,000 to about 50,000±25% PSI were utilized.

EXAMPLE IV

The same operating procedure was used to coat a 24 AWG copper wire with a diameter of 0.020 inches with lead, resulting in a composite wire with a diameter of 0.028 inches. The diameters of the entry and exit dies utilized were about 0.021 and about 0.028 inches, respectively, and the space between the dies was about 0.004 inches. Extrusion pressures of from about 30,000 to about 40,000 PSI ±25% were utilized.

EXAMPLE V

The same operating procedure was used to coat an aluminum wire 0.008 inches in diameter with lead, resulting in a composite wire with a diameter of 0.015 inches. The diameters of the entry and exit dies utilized were about 0.010 and about 0.015 inches, respectively, and the space between the dies was about 0.003 inches. Extrusion pressures of from about 40,000 to about 50,000 PSI ±25% were utilized.

EXAMPLE VI

The same operating procedure was used to coat a single monafilament optical fiber available from Owens-Corning Fiberglass of 0.015 inches in diameter with lead, resulting in a composite wire with a diameter of 0.025 inches. The diameters of the entry and exit dies utilized were about 0.018 and about 0.025 inches, respectively, and the space between the dies was about 0.005 inches. Extrusion pressures of from about 30,000 to about 40,000 PSI ±25% were utilized.

Similar operating parameters may be used to coat other fibers with extrudible, corrosion-resistant metals such as lead, zinc or nickel. For instance, other grades of Kevlar may be used, as well as materials such as the carbon fibers which are commercially available under the trade name "FORTA-FIL" made and sold by the Great Lakes Carbon Corporation in New York in several grades. In addition, other glass yarns such as the yarn known as "E glass" may be coated using the method of the present invention. Highly conductive metals such as silver, gold, nickel and tantalum may likewise be suitable as core materials for the composite wire of the present invention.

Production rates as high as about 500 feet per minute have been attained with the apparatus and method of the present invention, with extrusion pressures ranging up to about 60,000 pounds per square inch. The speed at which the composite wire is produced is limited by the temperature of the metal at the aperture of the exit die. This temperature will vary according to the metal being coated onto the core material and the pressure at which it is extruded. For instance, under the conditions summarized in Example I above, the temperature of the metal at the aperture of the exit die is approximately 585° F. This temperature is significantly lower than the melting point of lead, 620° F., thereby preventing liquid lead runaway, yet high enough to impart the required plasticity to the lead. In the case of zinc or nickel, temperatures at this point of between 725 and 760° F. or 1950 and 2050° F., respectively, are called for. Generally, at higher production rates, higher extrusion pressures are required, and hence, the temperature at the aperture of the exit die will be higher. In order to attain production rates higher than about 500 feet per minute under the conditions summarized in Example I, above, it is necessary to cool the area around the dies, i.e., by the use of hydraulic oil or synthetic cooling fluid such as is available under the brand name DOWTHERM, or a similar fluid, and input and output lines leading to a heat radiator.

The composite wire having a core of either a fibrous material or a highly conductive metal made by the above-described methods and a coating of lead may be woven on a conventional weaving apparatus into a scrim or wire cloth. In addition to its use in electrochemical cells, such a scrim or cloth has a number of other uses, for instance, as a blanket or wrapping to absorb ionizing and/or electromagnetic radiation or as sound insulation. The mass of the scrim per unit area, and hence its ability to absorb ionizing radiation, is governed by the number and diameter of composite wires per unit of length of the woven cloth, and to a lesser extent, by the choice of core material. Of course, a fabric woven from the composite wire of the present invention will not have total shielding, but will significantly attenuate the radiation. Multiple layers may also be used to increase attenuation as desired.

A large scrim or blanket woven with a lead-coated E glass core 0.020 inches in diameter, the core being 0.013 inches in diameter, can, for instance, be woven 10 strands to the inch and supplied in rolls. The blanket is wound off the rolls and glued or epoxied to the sheetrock used to finish out the interior walls of a building, thereby providing effective shielding of that room so that it can be safely used for X-ray equipment or radiation therapy equipment. The blanket may also be used as a curtain, hung, for instance, from a track so that it can be retracted for the same purpose.

Figure 23:
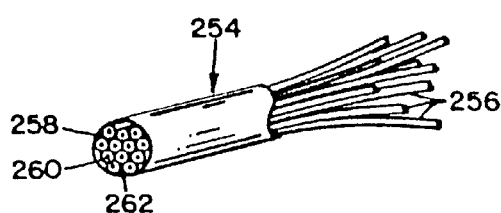
FIG. 23 is a perspective view of a cabled, composite wire which may be constructed according to the present invention, with one end of the wire being shown cut in cross section and the other end broken away.

When an optical fiber is used as the core material, the resulting composite wire has particular application in telecommunications cables. Several such composite wires may be cabled and coated with a lead sheath as shown in FIG. 23 and as will be developed. Optical telecommunications cables are often laid through sewers, buried in the earth, or placed in other environments in which the cable will be subject to chemical attack either directly or from the products of certain types of bacteria found in such locations. In such environments, conventional insulating and protectant coatings may be degraded, whereas a coating of lead or other extrudible, corrosion-resistant metal will not be degraded.

The presently preferred use of the composite wire of the present invention is as a grid in the electrode of a lead acid battery, shown in FIG. 6. The scrim 180 is cut to the appropriate size and a pure (or alloyed) lead back frame 182 is provided to collect and remove current from the grid. For special applications, at the points in the fabric at which the lead wires cross each other 184, the wires may be welded or electroplated together. At the edges of the scrim, the wires may either be wrapped, as shown at 186, or provided with a frame 182, as shown at 188. The frame 182 may be cast, welded, or extruded onto the scrim 180, and may be comprised of any appropriate material providing mechanical strength, with or without electrical properties.

Figure 14:
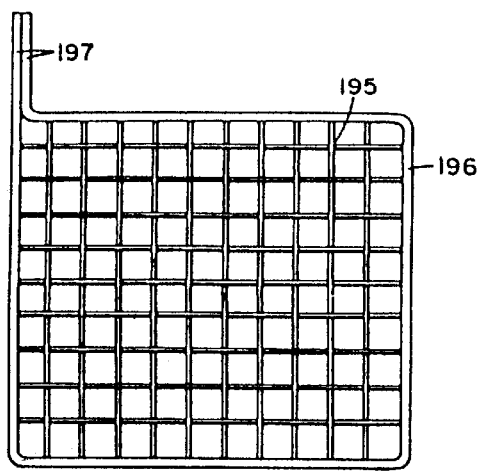
FIG. 14 is a front view of an electrode grid constructed according to the method and with the apparatus of the present invention.
Figure 15:
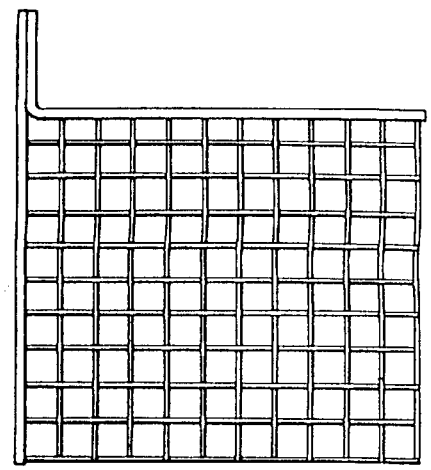
FIG. 15 is an alternative embodiment of the electrode grid of FIG. 14.
Figure 16:
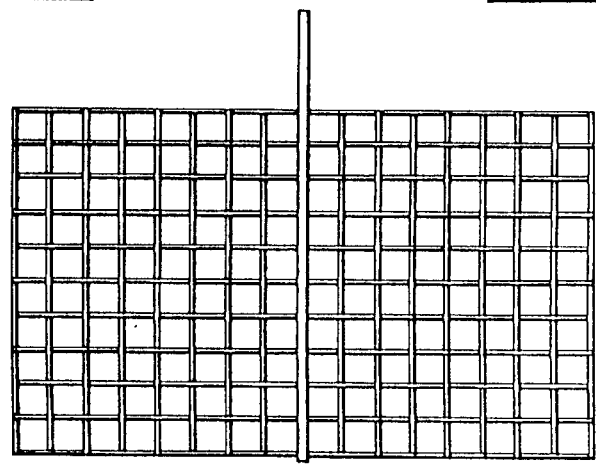
FIGS. 16–18 are also alternative embodiments of the electrode grid of FIG. 14.

The scrim of composite wire, having either a fibrous material or a highly conductive metal core, may also be provided with a frame constructed of a composite wire, or bus bar, constructed according to the present invention and having a highly conductive metal core as shown in FIG. 14. For purposes of clarity, the details of the electrode grid which are shown in FIG. 6 are not shown in FIG. 14 (or FIGS. 15–18). FIG. 14 shows a grid constructed of a scrim 195 and frame 196, the frame 196 terminating in two posts, designated generally at 197, which are, electrically speaking, integral in that both carry current of the same charge in the same direction, i.e., to the terminal of a battery (not shown) or to another grid in the battery (not shown). The ends of the wires which comprise scrim 195 are soldered to frame 196. The frame is comprised of a relatively thick composite wire (i.e., 0.028 inches in diameter in a presently preferred embodiment) having a copper core material and a lead coating in a presently preferred embodiment. This construction combines the high conductivity of copper with the long life provided by the fact that the acid in the battery "sees" only the exterior coating of lead on the bus bar or frame 196. For special applications in which the weight of the battery is not of primary concern, or in which a high current is needed, or in situations in which the normal heating of the battery during charge/discharge cycles must be minimized, the scrim 195 may also be constructed of a composite wire having a highly conductive metal core rather than a fibrous material core. Depending upon the use to which it will be put, several alternative constructions of the bus bar and scrim may be utilized such as those shown in FIGS. 15–18.

When a composite wire made by extruding a 0.006 inch coating of lead onto C glass with a 0.013 inch diameter was woven into such a scrim, the weave was such that the distance between the points 184—184 in FIG. 6 was approximately 0.2 inches. It will be recognized by those skilled in the art who have the benefit of this disclosure that spacings as large as about one inch or as small as about 0.1 inches may be desirable in certain applications, and that different diameters of lead-coated wire may be woven into a scrim to optimize grid strength and conductivity for certain applications. For instance, negative grids have different operating requirements, and may require different scrim spacing and lead coating thickness than positive grids.

The grid shown in FIG. 6 may be used for either the positive or negative grid of the battery. When used as the positive grid, the scrim 180 must be coated with a thick layer of active material. Because of the loose weave of the scrim 180, during manufacture of the positive electrode, a paste of active material 190 may be forced into the spaces 192 of the scrim 180. When cured, the latticework of the scrim acts as a scaffolding to retain the active material on the grid, and the result is an electrode of increased durability and conductivity, and decreased weight. Further, the tests which are described below have shown that it is possible to modify batteries according to the teachings of the present invention such that the modified battery will out-perform an identical, unmodified battery. Consequently, it has been discovered that it is possible to reduce the amount of active material applied to each grid, while maintaining the performance characteristics of the battery constructed from those grids, resulting in a savings of space as well as weight.

For even greater durability of the active material of the positive electrode, with decreased weight compared to conventional positive electrodes, lead-coated composite wire made according to the method of the present invention of approximately 0.015 inches in diameter with a lead coating of approximately 0.003 inches in thickness may be chopped into short pieces (approximately 0.1 to 0.5 inches long) and homogeneously mixed into the paste of active material. As shown in FIG. 6, the short pieces of lead-coated composite wire 194 are dispersed throughout the paste of active material 190, and the paste is then applied to the scrim 180. The high tensile strength of the lead-coated composite wire in the scrim 180 helps hold the active material in place in much the same manner that steel reinforcing bars give strength to concrete castings, and the pure lead coating of the short lead-coated composite wires 194 provides a multitude of light weight, superconducting paths through the active material 190. In this manner, the electrode constructed in accordance with the present invention overcomes the limitations of the thickness of the active material imposed by the weight of the active material, the semiconductor characteristics of the active material and the internal support needed to keep the active material from falling apart.

Even though the layer of active material on the negative electrode grid is strong enough and of adequate electrical conductivity so as not to require the presence of the chopped lead-coated composite wire as described above, the composite wire of the present invention may still be used to advantage in the negative electrode. In particular, lead-coated composite wire produced according to the method of the present invention may be woven into a scrim to serve as the grid element of the negative electrode. Because of the high tensile and shear strength of the composite wire of the present invention and its light weight, such a grid represents a significant improvement in the durability of the grid as well as a substantial decrease in the weight of the grid.

A plurality of pairs of positive and negative electrodes constructed according to the present invention may be assembled into an otherwise conventional battery case to provide a battery of high capacity, long life and high specific energy.

The lead-coated composite wire of the present invention is particularly well adapted for use in a so-called "biplate" battery. These batteries are characterized by the high voltages they produce (on the order of 2.2 V per cell and 50–150 VDC per battery), with low current, and their small size, which can be as small as that of a conventional battery. Of special significance is the fact that each of the cells of a biplate battery conducts energy "through the wall" of the cell and into the next cell, eliminating the heavy lead bus bars that parallel the positives and negatives in a single cell. Further, since battery output current is low and voltage is high, smaller lead posts can be used at each end of the battery, leading to further weight savings.

A biplate battery can be constructed of a series of cells arranged so as to keep the electrolyte of each of the cells separate while providing for electrical continuity between cells. This separation is accomplished by plates 198 (See FIGS. 7–10), made of polyethylene, polypropylene or similar material, the edges 200 of which are embedded in the walls 202 of the battery case 204, sealing the cells 206A, 206B, 206C, and 206D. The top edges 208 of the plates 198 are embedded in the top 210 of the battery case 204 to completely seal the cells 206A, 206B, 206C, and 206D.

The electrical conductivity between cells is provided by the lead-coated wire of the present invention, which is woven into a scrim 212 and wrapped around the edges of the plates 198 before the plates 198 are embedded in the walls 202 and top 210 of battery case 204. The scrim 212 can be woven and applied to the plate 198 in the configuration shown in FIGS. 7 and 10, which is the presently preferred configuration, or in the alternative embodiment shown in FIG. 8. In the embodiment shown in FIGS. 7 and 10, the current moves from cell 206D to cell 206C, and then on to cell 206B and cell 206A, in the direction of the arrows 214 (i.e., over the top 208 of plate 198). In the alternative embodiment shown in FIG. 8, the current moves from one cell to the next in the direction of arrows 216 (i.e., around the edges 200 of plate 198). It is understood that a combination of a tight press fit and/or sealant is used at the edges 200 and top 208 of the plates 198 to seal them to the walls 202 and top 210 of battery case 204 regardless of which embodiment is used.

Figures 7, 8:
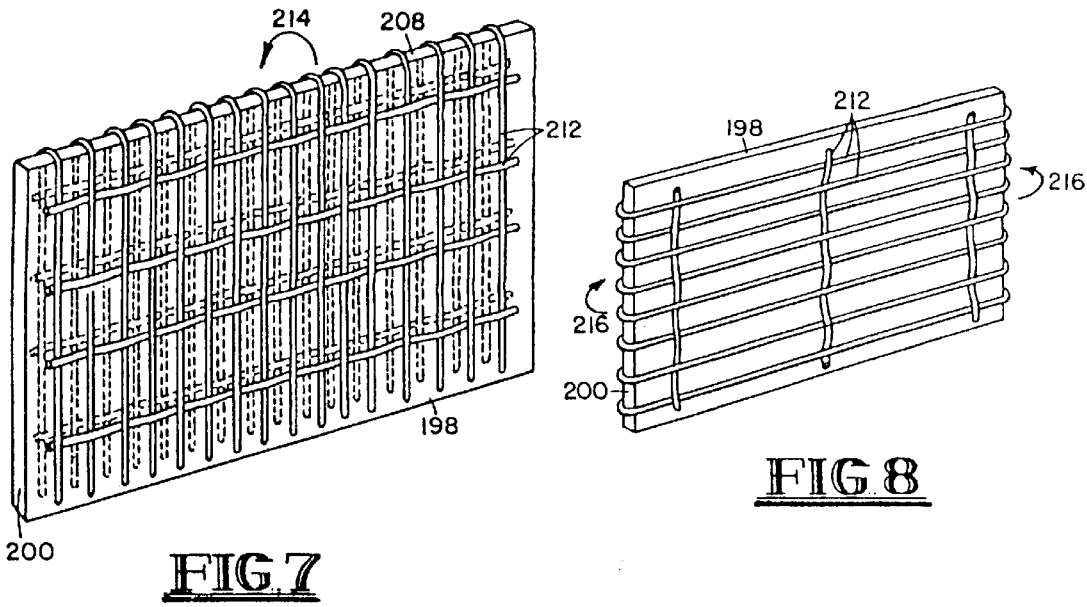
FIG. 7 is an elevated, perspective view of an electrode which may be constructed from a scrim woven with the lead coated wire produced according to the method and with the apparatus of the present invention for use in the construction of a biplate battery.
FIG. 8 is an elevated, perspective view of an alternative form of the electrode shown in FIG. 7.
Figures 9, 10:
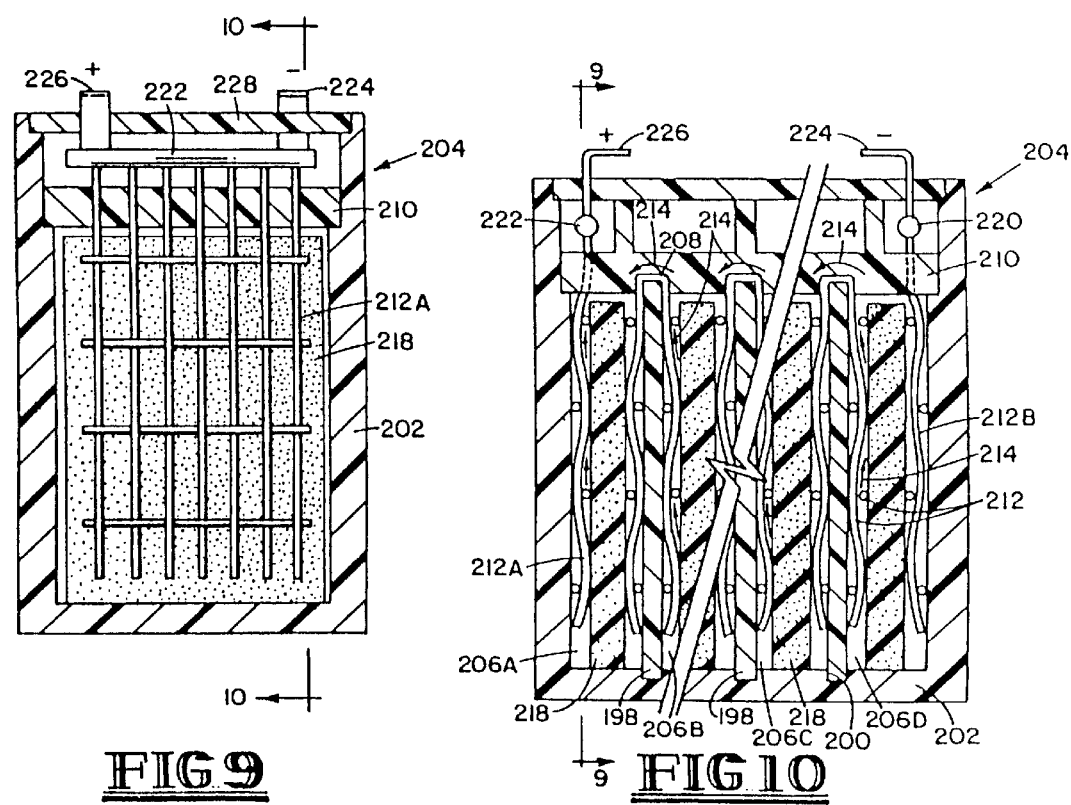
FIG. 9 is a cross section of a biplate battery constructed according to the present invention taken along the lines 9—9 in FIG. 10.
FIG. 10 is a longitudinal cross section of a biplate battery constructed according to the present invention taken along the lines 10—10 in FIG. 9.

If the embodiment shown in FIGS. 7 and 10 is utilized, the number of vertical wires in the scrim 212 is increased to facilitate conductance over the top edge 208 of plate 198 in the direction of the arrows 214; if the embodiment shown in FIG. 8 is utilized, the number of horizontal wires in the scrim 212 is increased to facilitate conductance around the edges 200 of the plate 198 in the direction of the arrows 216. The plates 198, with the scrim 212, are provided with a paste of active material (not shown for purposes of clarity) as is known in the art. It is understood that the positive side of each plate 198 is provided with a positive paste, that the negative side of the plate is provided with a negative paste, and that the paste is not continuous around the edges 200 or top 208 of the plates 198. The scrim 212A is provided with a layer of positive paste, and the scrim 212D is provided with a layer of negative paste. Depending upon the thickness of the layer of active material and the purpose for which the battery will be used, the number of horizontal wires in the scrim 212 in the embodiment shown in FIGS. 7 and 10 may be decreased or the horizontal wires may even be eliminated; in the case of the alternative embodiment shown in FIG. 8, the number of vertical wires in the scrim 212 may be reduced or even eliminated. The scrim is provided only with enough wires running in a direction perpendicular to the direction of the current to provide the amount of durability required for a particular application.

The individual cells 206A, 206B, 206C and 206D are filled with an electrolyte (not shown), which can be either a liquid or a gel. The cells are also provided with separator 218, made of C glass, and a fully oxidized pad, which acts as a "sponge" to hold electrolyte. The separators 218 are thick enough that they actually contact the active material on the scrim 212, facilitating their function of helping to hold the active material in place by sandwiching the active material between the separator 218 and the plate 198. In the case of scrims 212A and 212D, the separator 218 helps to hold the active material in place between the separator 218 and the end walls of the battery case 204.

The cells 206D and 206A, at the negative and positive ends of the battery case 204, respectively, are provided with scrims 212D and 212A, respectively. These scrims 212D and 212A are terminated at their top edge on bus bars 220 and 222, respectively, sealed in glass, polypropylene or other plastic, or glass in polypropylene. The bus bars 220 and 222 may be constructed of lead or, preferably, copper, and the scrims 212D and 212A are soldered or welded to their respective bus bars 220 and 222. Bus bars 220 and 222 are provided with posts 224 and 226, respectively, The top 210 of the battery case 204 is provided with a cover 228, which could also be provided with a conventional vent hole (not shown) as is known in the art.

Figure 13:
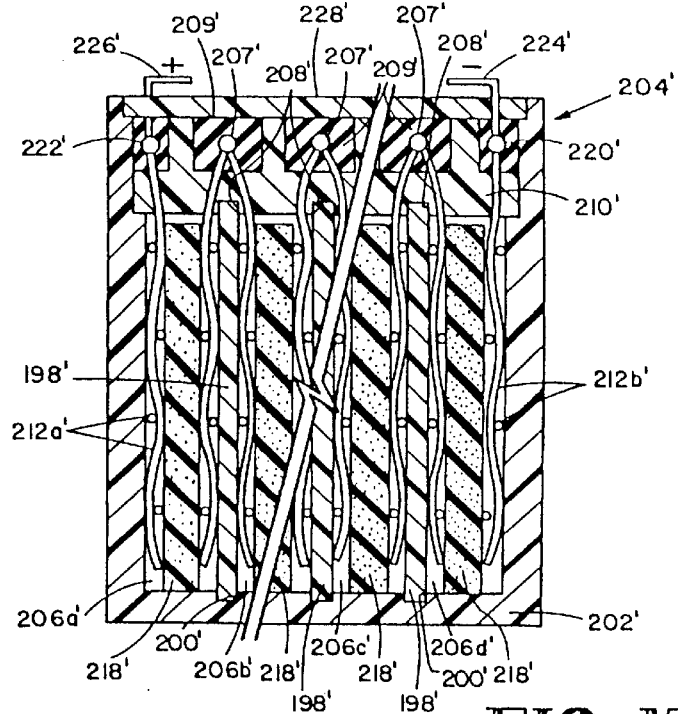
FIG. 13 is a longitudinal cross section of an alternative construction of the biplate battery shown in FIG. 10.

Referring to FIG. 13, there is shown an alternative embodiment of the biplate battery of FIGS. 9 and 10, in which the various parts are referenced, to the extent possible, by the same numerals which are used in FIGS. 9 and 10. Plates 198' are embedded in walls 202' of battery case 204', sealing the cells 206A', 206B', 206C' and 206D'. The top edges 208' are embedded in the top 210' of battery case 204' to completely seal the cells 206A', 206B', 206C' and 206D'.

A scrim 212' is woven and applied to the plates 198' in much the same manner as shown in FIGS. 7 and 8, but the wires of scrim 212' are not continuous around the edges 200' or the top edges 208' of plates 198'. Electrical conductivity between cells is provided by connectors 207', which may be constructed of copper or aluminum, to which scrims 212' are connected. To save additional weight in applications which do not require high current output, connectors 207' may be eliminated and the wires of scrims 212' may simply be twisted, soldered or electroplated together. In the embodiment shown in FIG. 13, connectors 207' are isolated from chemical attack by the electrolyte (not shown) contained in cells 206A', 206B', 206C' and 206D', consequently it is not necessary to construct connectors 207' from the composite wire of the present invention having a highly conductive metal core and a lead coating to resist attack by the acid electrolyte. Connectors 207' are isolated from the electrolyte by top 204', and may be embedded in the material making up the top 210' or, as shown in FIG. 13, in another material such as the silicone rubber inserts 209'. Both top 210' and inserts 209' may be constructed of a variety of other materials as discussed above with reference to FIGS. 9 and 10.

The individual cells 206A', 206B', 206C' and 206D' are filled with an electrolyte, which can be either a liquid or a gel (also known as a starved immobilized or recombinant electrolyte). When a gel electrolyte is used, the battery constructed in the manner shown in FIG. 13 is particularly well adapted to applications in which the battery will be vibrated or even inverted because the electrolyte cannot spill out of the cells. Each of the cells, 206A', 206B', 206C' and 206D' is provided with a separator 208' which contacts the paste of active material (not shown) which is applied to scrims 212' on both sides of each plate 198, and to the scrims 212A' and 212D' at the ends of battery case 204'.

Scrims 212A' and 212D' are terminated at their top edge on bus bars 220' and 222', respectively, sealed in the inserts 209'. The bus bars 220' and 222' may be constructed of lead or, preferably, copper, and the scrims 212D' and 212A' are soldered or welded to their respective bus bars 220' and 222'. Bus bars 220' and 222' are provided with posts 224' and 226', respectively. The top 210' of the battery case 204' is provided with a cover 228', which may be sealed if a gel electrolyte is used or provided with a conventional vent hole (not shown) as is known in the art.

Examples of the benefits of the present invention are as follows. Copper bus wire of 18 AWG (0.040 inches in diameter) was coated with a 0.005 inch layer of lead to make a composite bus wire of 0.050 inches in diameter, and the internal lead straps and connectors of a commercially available, heavy duty, golf cart size, 6 volt deep cycle battery were replaced with this composite wire. A total of 2.57 pounds of internal lead straps and connectors were replaced with 0.31 pounds of composite bus wire of equal current capacity, a connector weight savings of approximately 88%. The resulting battery has performance characteristics which are at least equal in all respects to the performance of the unmodified battery. Further, the bus bars constructed in this manner are smaller in diameter than the conventional straps and connectors, making possible a more compact battery with equal capacity.

Another heavy duty, golf cart size, 6 volt deep cycle battery was modified by replacing its grids with grids constructed as shown in FIG. 14. The scrim was woven from a composite wire of 0.020 inches in diameter with a C glass core 0.012 inches in diameter with a 0.004 inch thick layer of lead coated onto it. The bus wire frame was a lead/copper (18 AWG) composite wire with a diameter of 0.050 inches and a 0.005 inch thick layer of lead. The 69 grids which were replaced weighed a total of 16.33 pounds, excluding active material paste, and the grids constructed according to the teachings of the present invention which replaced those conventional grids weighed 4.08 pounds, excluding active paste materials, resulting in a grid weight savings of approximately 75%. The modified battery performed at least as well as the unmodified battery, and in some performance characteristics, it has exceeded the capabilities of the unmodified battery. For instance, the modified battery produces approximately 25% greater amp hours than the unmodified battery at the same discharge currents. The gross wet weight of the battery was reduced from about 65 pounds to about 49 pounds, a weight savings of approximately 25%. In other tests, 12 volt lead acid aircraft batteries modified in the same way indicate approximately a 30% reduction in weight (25 pounds each down to about 17 pounds wet weight) and higher total charge capacity at equivalent discharge rates.

As stated above, the composite lead-coated wire of the present invention may be woven into a scrim for use as an electrode grid. A 0.015 inch diameter lead coated wire with a 0.008 inch copper wire core is approximately five and one half times more conductive than a 0.015 inch diameter lead coated wire with a glass core. Aluminum wire has also been used as a core material, and it is expected that other highly conductive metals such as silver, gold, nickel and tantalum may likewise be utilized for this purpose. Each core metal has advantages and disadvantages. For instance, the lead to copper bond is excellent, but the aluminum to lead bond is relatively poor. However, the aluminum core composite wire is much lighter than copper core composite wire, indicating that an aluminum core composite wire may be the construction which is preferred for applications in which light weight is more important than durability. Copper core composite wire is smaller in diameter at equal current ratings, making thinner grids, and therefore a more compact battery, possible. Silver and gold are excellent conductors, but their price is so high as to restrict their use to special applications.

Of special importance is the fact that a scrim woven from a lead-coated, wire having either a fibrous core or a core of highly conductive metal retains its flexibility and can be rolled into tight spiral cells, making possible a high current, rechargeable lead-acid battery in sizes as small as "AA", something which is not possible with stamped, die cut or expanded lead grids.

Figure 17:
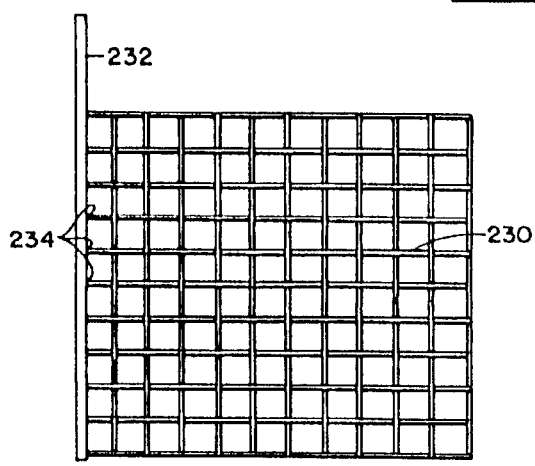
Figure 18:
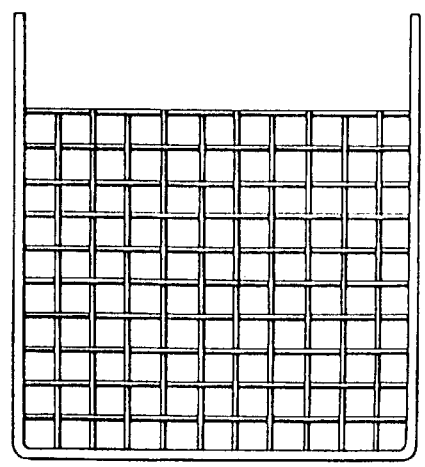

Several "AA" size batteries have been constructed according to the teachings of the present invention and tested at currents of 10 amps discharge. The grids are shown in FIG. 17, and are constructed of a scrim 230 woven from a 0.020 inch diameter composite wire with a 0.012 inch diameter C glass core and a 0.004 inch thick coating of lead. The conductor 232 used to remove current from the grid cloth is a composite wire of 0.028 inches in diameter having a 24 AWG copper bus wire core of 0.020 inches in diameter with a coating of lead extruded onto it which is 0.004 inches thick. The composite bus wire is soldered to the composite grid cloth 230 all around the ends 234 of the wires making up the grid 230. The bus wire may be eliminated for low current applictions, and any one of the configurations of conductor and grid cloth shown in FIGS. 14–18 may be utilized for certain battery applications.

Figure 19:
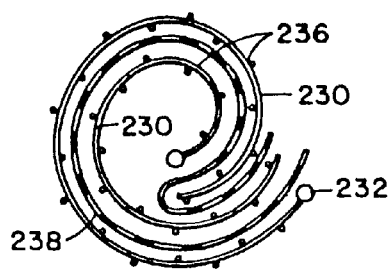
FIG. 19 is a top view of a positive and negative electrode pair constructed according to the method and with the apparatus of the present invention, insulated from each other by a separator, as they are assembled into a spiral wound rechargeable lead acid battery.
Figure 20:
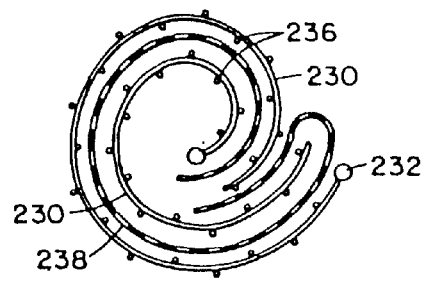
FIG. 20 is a top view of the positive and negative electrode pair shown in FIG. 19, but showing a different way to wind the positive and negative electrode pair.
Figure 22:
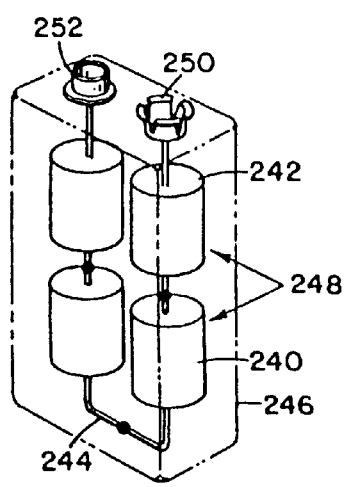
FIG. 22 is an exploded, perspective view of an electrochemical cell which may be constructed from the positive and negative electrode pair shown in FIG. 19.

Referring to FIG. 19, there is shown a pair of electrodes 236, constructed as shown in FIG. 17, wound in a tight spiral, with a separator 238 interposed between them. An alternative construction of the cell is shown in FIG. 20. FIG. 22 shows the electrodes 236 and separator 238, before they are wound into the spiral construction shown in FIG. 19, as they would be assembled into a casing 240. The casing 240 is sealed with cap 242, and casing 240 and 242 are provided with connectors 244. For purposes of clarity, the paste of active material and the electrolyte are not shown in FIGS. 19, 20 and 22. In a preferred embodiment, the electrolyte is a starved immobilized or recombinant gel electrolyte (also known as a suspended eletrolyte) to prevent the release of gas during the charging of the battery. The connectors may be of conventional bus wire construction, but preferably are constructed of a composite wire with a copper or aluminium core as described above. The grid cloth in the chimney portion 245 of electrodes 236 can be twisted and threaded through cap 242 for use as a connector rather than using the separate connectors 244 as shown in FIGS. 19–22. Although the elimination of connectors 244 saves some weight, the ability of the twisted chimney 245 to conduct current is less than the conductivity of the composite wire bus bars having a core of highly conductive metal. Consequently, such a construction is preferred for applications in which low weight is of primary concern rather than the ability of the battery to deliver power.

Figure 21:
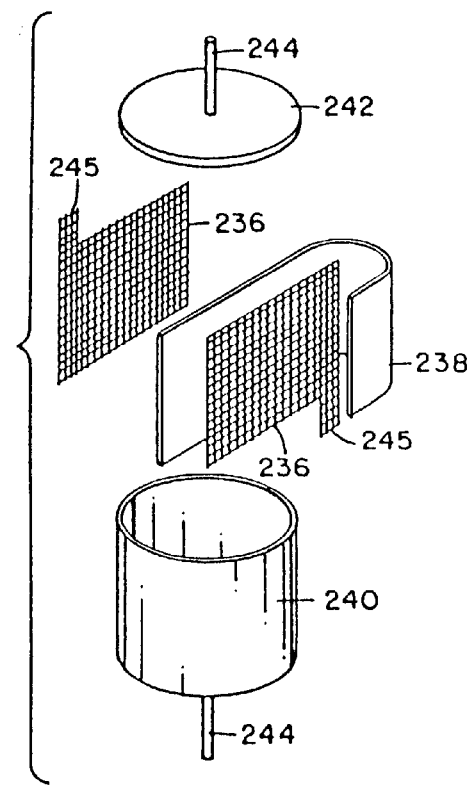
FIG. 21 is a perspective, somewhat schematic, view of a nine volt, rechargeable battery which may be constructed from four of the electrochemical cells shown in FIG. 22, the case of the battery being shown in shadow lines to make its interior construction clear.

Four of the cells shown in FIGS. 19 and 22, each of which is capable of producing about 2.2 volts, can be assembled into the battery case of a conventional nine volt battery as shown in FIG. 21. Battery case 246 is shown in shadow lines to show the internal construction of the battery, which is comprised of four cells 247 wired in series by connectors 244. Connectors 248 terminate in a conventional positive electrode 250 and negative electrode 252.

Batteries in sizes smaller than "D" size and in conventional nine volt size may also be constructed of cells constructed in the biplate design shown in FIGS. 9 and 10. Each casing 246 contains a number of cells with scrims such as the scrims shown at 212 in FIGS. 9 and 10 looping up over the tops of the plates in the same manner as scrims 212 loop over the top edge 208 of the plates 198 shown in FIGS. 7 and 8. Separators are provided the same as the separators 218, and bus bars and posts are used to conduct current and provide terminals in the same manner as the bus bars 220 and 222 and the posts 224 and 226 of FIGS. 9 and 10.

The present invention is also directed to the cabled composite wire shown in FIG. 23, and indicated generally at 254. Cabled composite wire 254 is comprised of several composite wires 256 constructed according to the teachings of the present invention and a lead sheath 258. The wires 256 are comprised of a core material 260 with a lead coating 262 as described above. The core material 260 can be either a fibrous material such as E glass, C glass, carbon or aramid fibers as discussed above, or a highly conductive metal such as aluminium or copper. In a preferred embodiment, ten composite wires 256 of 0.020 inches in diameter and having a C glass core were coated with a sheath of lead of approximately 0.010 inches in the thickness. The cabled composite wire was utilized as a high current, slow blow fuse material.

The composite wires 256 may be twisted, plied or braided before sheath 258 is applied to increase the tensile strength of cable 254. The lead sheath is applied by running the composite wires 256 through the apparatus of FIGS. 1 and 2 using a die assembly having dies with apertures of sufficiently large diameter to pass the composite wires 256 and to coat those wires 256 with the lead sheath 258 of desired thickness. For instance, to make the preferred cabled composite wire described above, an entry die with an aperture of 0.093 inches in diameter was used with an exit die having an aperture of 0.113 inches in diameter, the dies being spaced approximately 0.010 inches apart. An extrusion pressure of from about 30,000 to about 40,000 PSI ±25% was used, and the temperature in the die carrier was maintained at about 250 to 300° F. Cables have been made with as few as 6 or as many as 12 lead-coated fibers.

Cables constructed according to the teachings of the present invention can be tailored for particular applications. For instance, the preformance characteristics of the cable change depending upon the mass of the lead applied to the lead-coated fibers and the type of core fiber. An increase in the mass of the lead sheath which is applied to the lead-coated wires will, for instance, result in a cable which will not blow as quickly as a cable with less lead applied to it. Further, the increased strength of the cable, which results from the use of core materials such as E glass or synthetic fibers, allows an increase in production speeds as well as making the fuse material easier to handle.

It will be understood that various modifications and changes may be made in the present invention by those of ordinary skill in the art who have the benefit of this disclosure. All such changes and modifications fall within the spirit of this invention, the scope of which is measured by the following appended claims.

What is claimed is:

1. A composite wire made by a process comprising the steps of:

feeding a core material into an extrusion die;

extruding an extrudable corrosion resistant metal through the die; and contacting said extruded metal with said core material as said core material is fed through the die to coat said core material, wherein said extruded metal has a longitudinally oriented grain structure and uniform grain size.

2. The composite wire of claim 1, wherein the metal is lead.

3. The composite wire of claim 1, wherein the metal has a sufficiently small grain structure size to substantially resist corrosive attack by sulfuric acid.

4. The composite wire of claim 2, wherein the grain structure size of the extruded lead is approximately $0.25 \times 10^{-6}$ inch.

5. A composite wire comprising:

a core material surrounded by an extruded extrudable corrosion-resistant metal;

said extruded metal having a longitudinally oriented grain structure and uniform grain size.

6. The composite wire of claim 5, wherein the metal is lead.

7. The composite wire of claim 5, wherein the metal has a sufficiently small grain structure size to substantially resist corrosive attack by sulfuric acid.

8. The composite wire of claim 6, wherein the grain structure size of the extruded lead is approximately $0.25 \times 10^{-6}$ inch.

* * * * *